US007882818B2

(12) United States Patent
Takami et al.

(10) Patent No.: US 7,882,818 B2
(45) Date of Patent: Feb. 8, 2011

(54) CYLINDER LINER AND ENGINE

(75) Inventors: Toshihiro Takami, Toyota (JP); Kouhei Hori, Aichi-ken (JP); Takeshi Tsukahara, Toyota (JP); Noritaka Miyamoto, Toyota (JP); Masaki Hirano, Toyota (JP); Yukinori Ohta, Nagoya (JP); Satoshi Yamada, Toyota (JP); Kouhei Shibata, Toyota (JP); Isao Katou, Okaya (JP); Yoshio Naruse, Okaya (JP); Giichiro Saito, Yamagata (JP); Masami Horigome, Yamagata (JP); Takashi Sato, Yamagata (JP)

(73) Assignees: Toyota Jidosha Kabushiki Kaisha, Toyota-shi (JP); Teikoku Piston Ring Co., Ltd., Chiyoda-ku (JP); Teipi Industry Co., Ltd., Sagae-shi (JP)

( * ) Notice: Subject to any disclaimer, the term of this patent is extended or adjusted under 35 U.S.C. 154(b) by 155 days.

(21) Appl. No.: 11/481,074

(22) Filed: Jul. 6, 2006

(65) Prior Publication Data

US 2007/0012178 A1 Jan. 18, 2007

(30) Foreign Application Priority Data

Jul. 8, 2005 (JP) ............................ 2005-200998

(51) Int. Cl.
*F02F 1/00* (2006.01)
*F02F 1/10* (2006.01)
*B23P 11/00* (2006.01)

(52) U.S. Cl. ............................... 123/193.2; 29/888.061

(58) Field of Classification Search .............. 123/193.2, 123/668, 193.1; 29/888.061; 92/169.1, 171, 92/171.1

See application file for complete search history.

(56) References Cited

U.S. PATENT DOCUMENTS

| | | | | |
|---|---|---|---|---|
| 3,641,882 | A * | 2/1972 | Hall | 92/171.1 |
| 4,486,938 | A * | 12/1984 | Hext | 29/402.06 |
| 5,183,025 | A * | 2/1993 | Jorstad et al. | 123/669 |
| 5,333,668 | A | 8/1994 | Jorstad et al. | |
| 5,537,969 | A * | 7/1996 | Hata et al. | 123/193.2 |
| 5,671,532 | A * | 9/1997 | Rao et al. | 29/888.061 |

(Continued)

FOREIGN PATENT DOCUMENTS

DE 197 29 017 A1 2/1999

(Continued)

OTHER PUBLICATIONS

International Search Report, PCT/JP2006/313912 dated Aug. 11, 2006.

(Continued)

*Primary Examiner*—Stephen K Cronin
*Assistant Examiner*—Sizo B Vilakazi
(74) *Attorney, Agent, or Firm*—Kenyon & Kenyon LLP

(57) ABSTRACT

A cylinder liner for insert casting used in a cylinder block is provided. The cylinder liner includes an outer circumferential surface having a plurality of projections. Each projection has a constricted shape. A film of a metal material is formed on the outer circumferential surface and the surfaces of the projections. As a result, the cylinder liner ensures sufficient bond strength with the casting material of a cylinder block, and sufficient thermal conductivity with the cylinder block.

24 Claims, 15 Drawing Sheets

U.S. PATENT DOCUMENTS

| | | | | | |
|---|---|---|---|---|---|
| 6,044,820 | A * | 4/2000 | Domanchuk et al. | 123/193.2 |
| 6,802,121 | B2 | 10/2004 | Fuganti et al. | |
| 6,865,807 | B2 * | 3/2005 | Miyamoto et al. | 29/888.061 |
| 7,226,667 | B2 * | 6/2007 | Kodama et al. | 428/600 |
| 2003/0056645 | A1 * | 3/2003 | Land et al. | 92/171.1 |
| 2003/0084567 | A1 * | 5/2003 | Dickmann et al. | 29/888.061 |
| 2007/0012179 | A1 * | 1/2007 | Takami et al. | 92/171.1 |
| 2007/0012180 | A1 * | 1/2007 | Miyamoto et al. | 92/171.1 |

FOREIGN PATENT DOCUMENTS

| | | | |
|---|---|---|---|
| DE | 19729017 | A1 * | 2/1999 |
| DE | 103 47 510 | B3 | 4/2005 |
| JP | 53-163405 | | 12/1978 |
| JP | 57 126537 | A | 8/1982 |
| JP | 63-018163 | A | 1/1988 |
| JP | 01-287236 | A | 11/1989 |
| JP | 02-123259 | A | 5/1990 |
| JP | 02-290664 | A | 11/1990 |
| JP | 2000-352350 | A | 12/2000 |
| JP | 2001-234806 | A | 8/2001 |
| JP | 2003-025058 | A | 1/2003 |
| JP | 2003 053508 | A | 2/2003 |
| JP | 2003-120414 | | 4/2003 |
| JP | 2003-326346 | A | 11/2003 |
| JP | 2003-326353 | A | 11/2003 |
| JP | 2005-194983 | A | 7/2005 |
| RU | 1287687 | A | 1/2000 |
| SU | 316252 | | 1/1972 |
| WO | WO 01/58621 | A1 | 8/2001 |
| WO | WO 2005/038073 | A2 | 4/2005 |
| WO | WO 2005/065867 | A | 7/2005 |

OTHER PUBLICATIONS

Written Opinion of the International Searching Authority, PCT/JP2006/313912.

International Preliminary Report on Patentability, PCT/JP2006/313912.

* cited by examiner

Composition of Cast Iron

| Basic Component | |
|---|---|
| T.C | 2.9 ~ 3.7 % by mass |
| Si | 1.6 ~ 2.8% by mass |
| Mn | 0.5 ~ 1.0% by mass |
| P | 0.05 ~ 0.4% by mass |

| Auxiliary Component | |
|---|---|
| Cr | 0.05 ~ 0.4% by mass |
| B | 0.03 ~ 0.08% by mass |
| Cu | 0.3 ~ 0.5% by mass |

※T.C denotes Total Carbon (A) Placement of test piece (B) Irradiation of Laser Light

CYLINDER LINER AND ENGINE

BACKGROUND OF THE INVENTION

The present invention relates to a cylinder liner for insert casting used in a cylinder block, and an engine having the cylinder liner.

Cylinder blocks for engines with cylinder liners have been put to practical use. Cylinder liners are typically applied to cylinder blocks made of an aluminum alloy. As such a cylinder liner for insert casting, the one disclosed in Japanese Laid-Open Patent Publication No. 2003-120414 is known.

To meet the recent demand for lower fuel consumption, a configuration has been proposed in which distances between cylinder bores of an engine are reduced to lighten the engine.

However, reduced distance between the cylinder bores causes the following problems.

(1) Sections between the cylinder bores are thinner than the surrounding sections (sections spaced from the sections between the cylinder bores). Thus, when producing the cylinder block through the insert casting, the rate of solidification is higher in the sections between the cylinder bores than in the surrounding sections. The solidification rate of the sections between the cylinder bores is increased as the thickness of such sections is reduced.

Therefore, in the case where the distance between the cylinder bores is short, the solidification rate of the casting material is further increased. This increases the difference between the solidification rate of the casting material between the cylinder bores and that in the surrounding casting material. Accordingly, a force that pulls the casting material located between the cylinder bores toward the surrounding sections is increased. This is highly likely to create cracks between the cylinder bores (hot tear).

(2) In an engine in which the distance between the cylinder bores are short, heat is likely to be confined in the sections between the cylinder bores. Thus, as the cylinder wall temperature increases, the consumption of the engine oil is promoted.

Accordingly, the following conditions (A) and (B) need to be met when improving the fuel consumption rate through reduction of the distance between the cylinder bores.

(A) To suppress the movement of the casting material from the sections between the cylinder bores to the surrounding sections due to the difference in the solidification rates, sufficient bond strength needs to be ensured between the cylinder liners and the casting material when producing the cylinder block.

(B) To suppress the consumption of the engine oil, sufficient thermal conductivity needs to be ensured between the cylinder block and the cylinder liners.

According to the cylinder liner disclosed in Japanese Laid-Open Patent Publication No. 2003-120414, a film is formed on the cylinder, which film establishes metallic bond with the casting material of the cylinder block. This structure increases the bond strength between the cylinder block and the cylinder liner. However, it has been found out that, in the case where the cylinder block is produced using such a cylinder liner, relatively large gaps are formed between the cylinder block and the cylinder liner, resulting in a reduced thermal conductivity. This is though to be caused by insufficient bond strength between the cylinder liner and the casting material during the production of the cylinder block.

SUMMARY OF THE INVENTION

Accordingly, it is an objective of the present invention to provide a cylinder liner that ensures sufficient bond strength with the casting material of a cylinder block, and sufficient thermal conductivity with the cylinder block. Another objective of the present invention is to provide an engine having such a cylinder liner.

According to a first aspect of the present invention, a cylinder liner for insert casting used in a cylinder block is provided. The cylinder liner includes an outer circumferential surface having a plurality of projections. Each projection has a constricted shape. A film of a metal material is formed on the outer circumferential surface and the surfaces of the projections.

According to a second aspect of the present invention, an engine including a cylinder block and a cylinder liner for insert casting is provided. The cylinder liner is bonded to the cylinder block. The cylinder liner includes an outer circumferential surface having a plurality of projections. Each projection has a constricted shape. A film of a metal material is formed on the outer circumferential surface and the surfaces of the projections.

According to a third aspect of the present invention, a cylinder liner for insert casting used in a cylinder block is provided. The cylinder liner includes an outer circumferential surface having a plurality of projections. Each projection has a constricted shape. A film is formed on the outer circumferential surface and the surfaces of the projections, the film increasing adhesion of the cylinder liner to the cylinder block.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6[B] is a graph showing one example of the relationship between axial positions and the temperature of the cylinder wall in the cylinder liner according to the first embodiment;

DETAILED DESCRIPTION OF THE PREFERRED EMBODIMENTS

First Embodiment

A first embodiment of the present invention will now be described with reference to FIGS. 1 to 18.

The present embodiment relates to a case in which the present invention is applied to cylinder liners of an engine made of an aluminum alloy.

<Structure of Engine>

Figure 1:
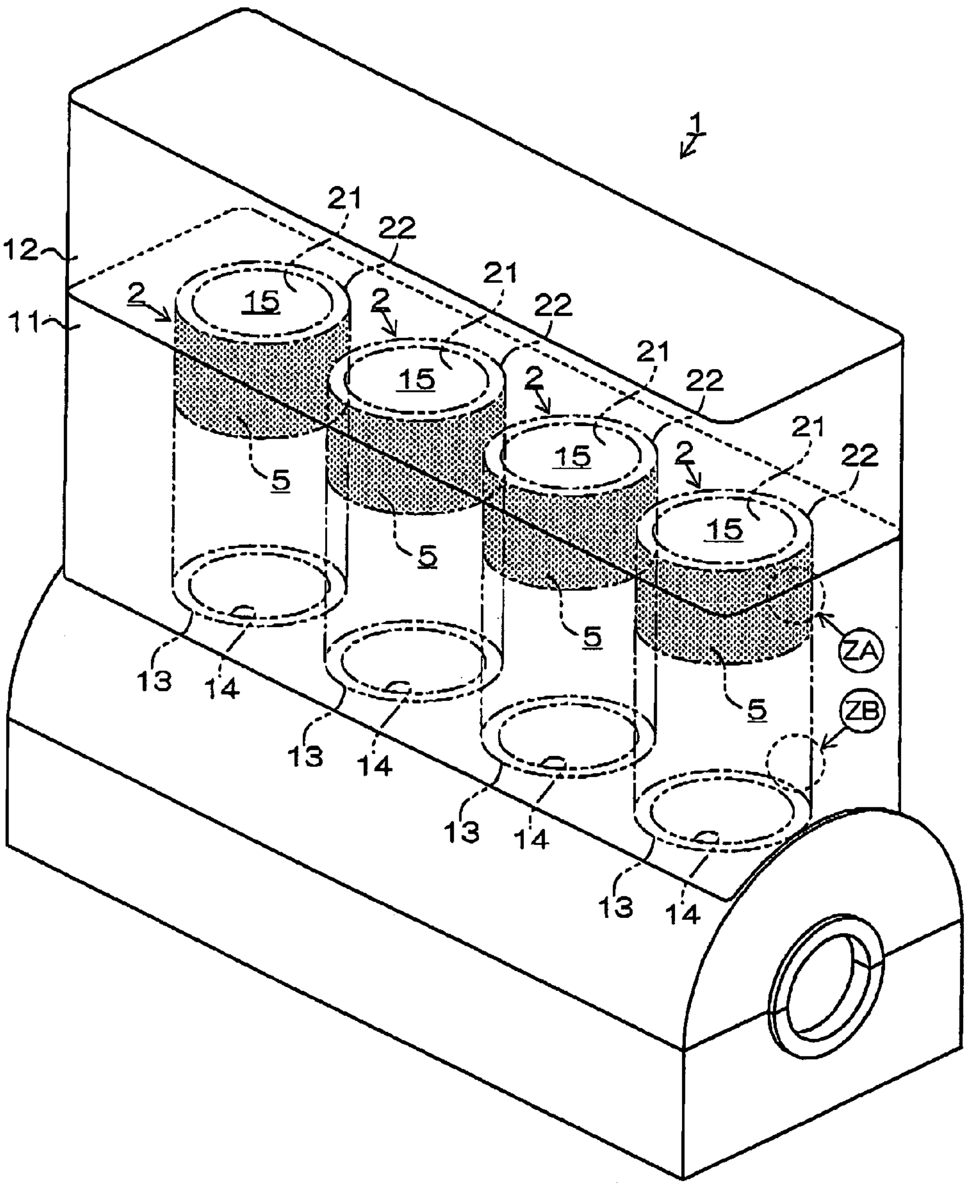
FIG. 1 is a schematic view illustrating an engine having cylinder liners according to a first embodiment of the present invention.

FIG. 1 shows the structure of an entire engine 1 having cylinder liners 2 according to the present invention.

The engine 1 includes a cylinder block 11 and a cylinder head 12.

The cylinder block 11 includes a plurality of cylinders 13. Each cylinder 13 includes one cylinder liner 2.

The inner circumferential surface of each cylinder liner 2 (the liner inner circumferential surface 21) forms the inner wall (cylinder inner wall 14) of the corresponding cylinder 13 in the cylinder block 11. Each liner inner circumferential surface 21 defines a cylinder bore 15.

Through the insert casting of a casting material, the outer circumferential surface of each cylinder liner 2 (a liner outer circumferential surface 22) is brought into contact with the cylinder block 11.

As the aluminum alloy as the material of the cylinder block 11, for example, an alloy specified in Japanese Industrial Standard (JIS) ADC10 (related United States standard, ASTM A380.0) or an alloy specified in JIS ADC12 (related United States standard, ASTM A383.0) may be used. In the present embodiment, an aluminum alloy of ADC 12 is used for forming the cylinder block 11.

<Structure of Cylinder Liner>

Figures 2, 3:
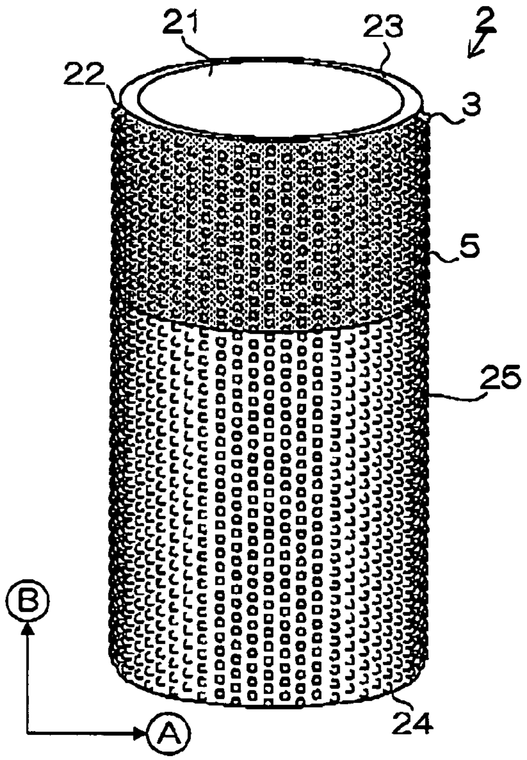
FIG. 2 is a perspective view illustrating the cylinder liner of the first embodiment.
FIG. 3 is a table showing one example of composition ratio of a cast iron, which is a material of the cylinder liner of the first embodiment.

FIG. 2 is a perspective view illustrating the cylinder liner 2 according to the present invention.

The cylinder liner 2 is made of cast iron.

The composition of the cast iron is set, for example, as shown in FIG. 3. Basically, the components listed in table "Basic Component" may be selected as the composition of the cast iron. As necessary, components listed in table "Auxiliary Component" may be added.

Projections 3, each having a constricted shape, are formed on the liner outer circumferential surface 22 of the cylinder liner 2.

The projections 3 are formed on the entire liner outer circumferential surface 22 from an upper end of the cylinder liner 2 (liner upper end 23) to a lower end of the cylinder liner 2 (liner lower end 24). The liner upper end 23 is an end of the cylinder liner 2 that is located at a combustion chamber in the engine 1. The liner lower end 24 is an end of the cylinder liner 2 that is located at a portion opposite to the combustion chamber in the engine 1.

In the cylinder liner 2, a film 5 is formed on the surfaces of the liner outer circumferential surface 22 and the projections 3.

On the liner outer circumferential surface 22, the film 5 is formed in an area from the liner upper end 23 to a middle portion in the axial direction (liner middle portion 25). Also, the film 5 is formed along the entire circumferential direction.

The film 5 is formed of an Al—Si sprayed layer 51. The sprayed layers refer to films formed by spraying (plasma spraying, arc spraying, or HVOF spraying).

As the material for the film 5, a material that meets at least one of the following conditions (A) and (B) may be used.

(A) A material the melting point of which is lower than or equal to the temperature of the molten metal of the casting material (reference molten metal temperature TC), or a material containing such a material. More specifically, the reference molten metal temperature TC can be described as below. That is, the reference molten metal temperature TC refers to the temperature of the molten metal of the casting material of the cylinder block 11 when the casting material is supplied to a mold for performing the insert casting of the cylinder liners 2.

(B) A material that can be metallurgically bonded to the casting material of the cylinder block 11, or a material containing such a material.

<Structure of Projection>

Figure 4:
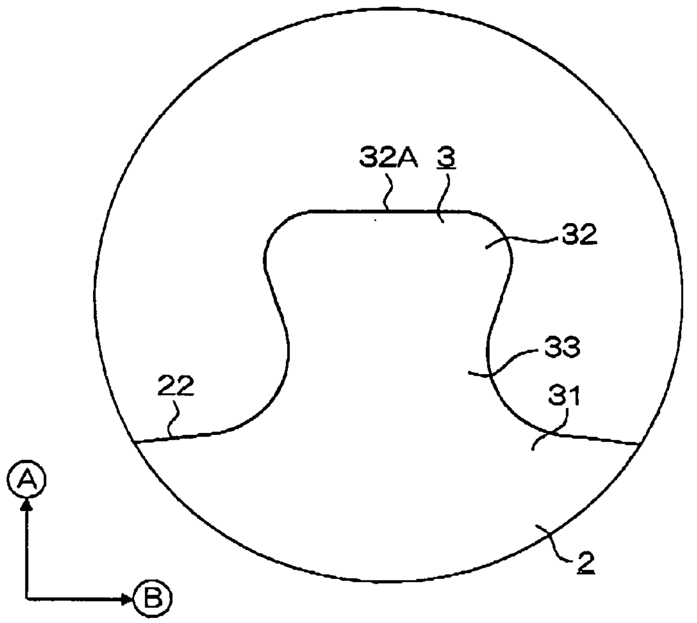
FIG. 4 is a model diagram showing a projection having a constricted shape formed on the cylinder liner of the first embodiment.

FIG. 4 is a model diagram showing a projection 3. Hereafter, a radial direction of the cylinder liner 2 (direction of arrow A) is referred to as an axial direction of the projection 3. Also, the axial direction of the cylinder liner 2 (direction of arrow B) is referred to as a radial direction of the projection 3. FIG. 4 shows the shape of the projection 3 as viewed in the radial direction of the projection 3.

The projection 3 is integrally formed with the cylinder liner 2. The projection 3 is coupled to the liner outer circumferential surface 22 at a proximal end 31.

At a distal end 32 of the projection 3, a top surface 32A that corresponds to a distal end surface of the projection 3 is formed. The top surface 32A is substantially flat.

In the axial direction of the projection 3, a constriction 33 is formed between the proximal end 31 and the distal end 32.

The constriction 33 is formed such that its cross-sectional area along the axial direction (axial direction cross-sectional area SR) is less than an axial direction cross-sectional area SR at the proximal end 31 and at the distal end 32.

The projection 3 is formed such that the axial direction cross-sectional area SR gradually increases from the constriction 33 to the proximal end 31 and to the distal end 32.

Figure 5:
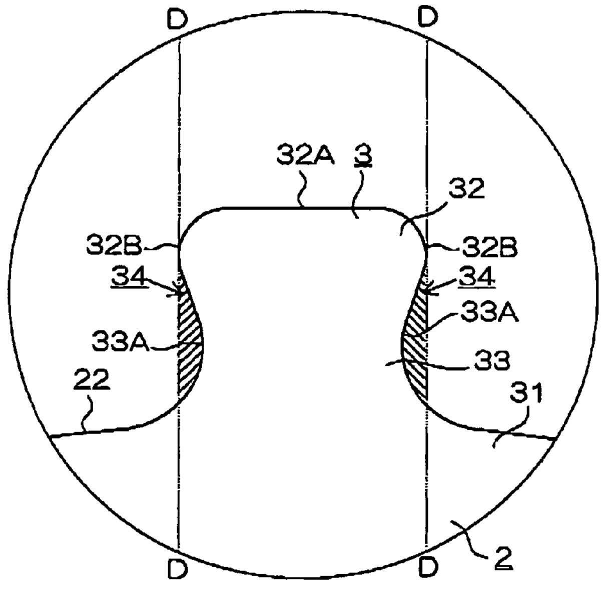
FIG. 5 is a model diagram showing a projection having a constricted shape formed on the cylinder liner of the first embodiment.

FIG. 5 is a model diagram showing the projection 3, in which a constriction space 34 of the cylinder liner 2 is marked.

In each cylinder liner 2, the constriction 33 of each projection 3 creates the constriction space 34 (shaded areas).

The constriction space 34 is a space surrounded by a curved surface that contains a largest distal portion 32B along the axial direction of the projection 3 (in FIG. 5, lines D-D corresponds to the curved surface) and the surface of the constriction 33 (constriction surface 33A). The largest distal portion 32B represents a portion at which the radial length of the projection 3 is the longest in the distal end 32.

In the engine 1 having the cylinder liners 2, the cylinder block 11 and the cylinder liners 2 are bonded to each other with part of the cylinder block 11 located in the constriction spaces 34 (the cylinder block 11 being engaged with the projections 3). Therefore, sufficient bond strength of the cylinder block 11 and the cylinder liners 2 (liner bond strength) is ensured. Also, since the increased liner bond strength suppresses deformation of the cylinder bores 15, the friction is reduced. Accordingly, the fuel consumption rate is improved.

On the other hand, when producing the cylinder block 11 through insert casting of the cylinder liner 2, the bond strength between the casting material of the cylinder block 11 and each cylinder liner 2 is ensured by the anchor effect. This suppresses the movement of the casting material from the sections between the cylinder bores 15 to the surrounding sections due to the difference in the solidification rates.

<Formation of Film>

Figure 6:
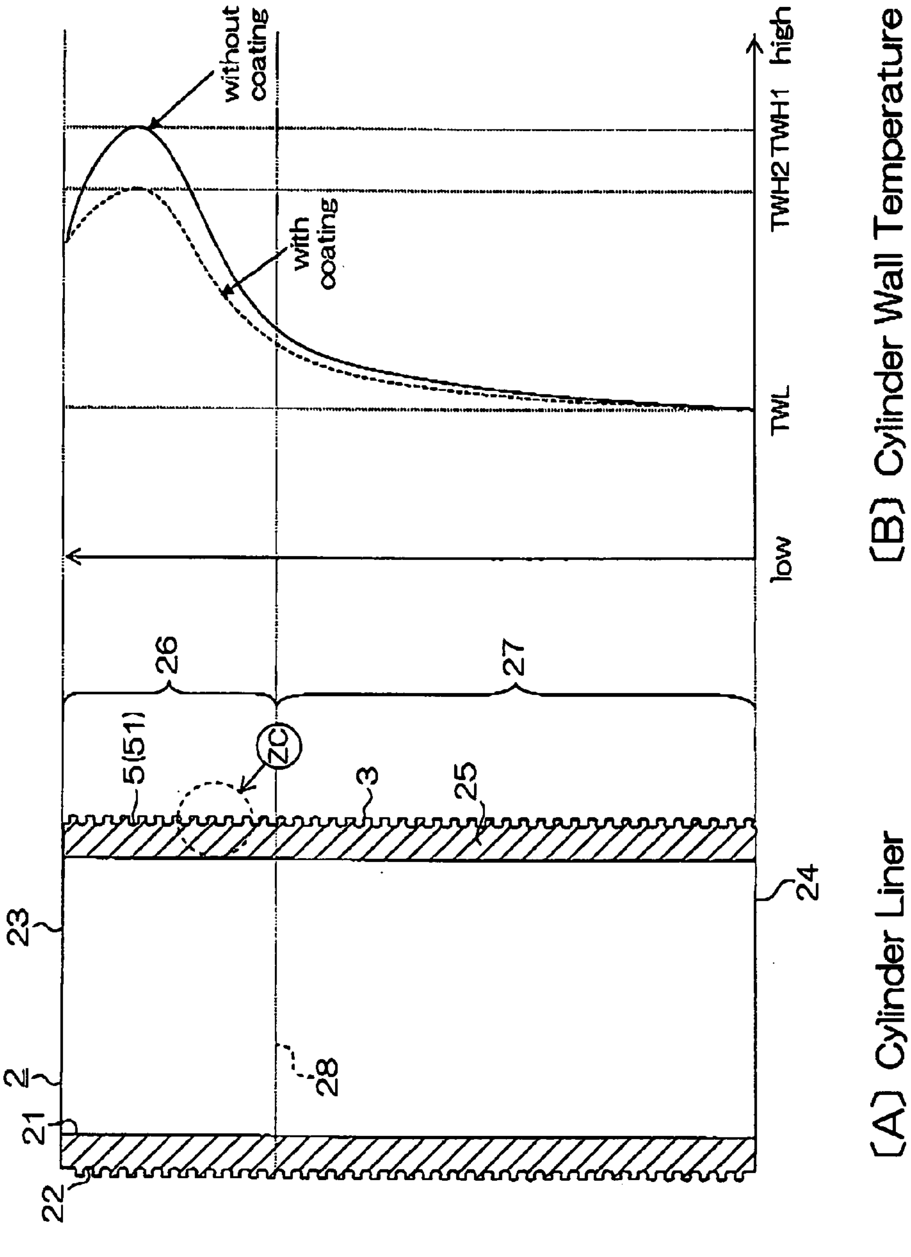
FIG. 6[A] is a cross-sectional view of the cylinder liner according to the first embodiment taken along the axial direction.

Referring to FIGS. 6[A] to 7, the formation of the film 5 on the cylinder liner 2 will be described. Hereafter, the thickness of the film 5 is referred to as a film thickness TP.

[1] Position of Film

Referring to FIGS. 6[A] and 6[B], the position of the film 5 will be described. FIG. 6[A] is a cross-sectional view of the cylinder liner 2 along the axial direction. FIG. 6[B] shows one example of temperature variation along the axial direction in the cylinder (cylinder wall temperature TW) in a steady operating state of the engine. Hereafter, the cylinder liner 2 from which the film 5 is removed will be referred to as a reference cylinder liner. An engine having the reference cylinder liners will be referred to as a reference engine.

In this embodiment, the position of the film 5 is determined based on the cylinder wall temperature TW in the reference engine.

The variation of the cylinder wall temperature TW of the reference engine will be described. In FIG. 6[B], the solid line represents the cylinder wall temperature TW of the reference engine, and the broken line represents the cylinder wall temperature of the engine 1 of the present embodiment. Hereafter, the highest temperature of the cylinder wall temperature TW is referred to as a maximum cylinder wall temperature TWH, and the lowest temperature of the cylinder wall temperature TW will be referred to as a minimum cylinder wall temperature TWL.

In the reference engine, the cylinder wall temperature TW varies in the following manner.

(a) In an area from the liner lower end 24 to the liner middle portion 25, the cylinder wall temperature TW gradually increases from the liner lower end 24 to the liner middle portion 25 due to a small influence of combustion gas. In the vicinity of the liner lower end 24, the cylinder wall temperature TW is a minimum cylinder wall temperature TWL. In the present embodiment, a portion of the cylinder liner 2 in which the cylinder wall temperature TW varies in such a manner is referred to as a low temperature liner portion 27.

(b) In an area from the liner middle portion 25 to the liner upper end 23, the cylinder wall temperature TW sharply increases due to a large influence of combustion gas. In the vicinity of the liner upper end 23, the cylinder wall temperature TW is a maximum cylinder wall temperature TWH1. In the present embodiment, a portion of the cylinder liner 2 in which the cylinder wall temperature TW varies in such a manner is referred to as a high temperature liner portion 26.

In the reference engine, since the consumption of the engine oil is promoted when the cylinder wall temperature TW of the high temperature liner portion 26 is excessively increased, the tension of the piston rings are required to be relatively great. That is, the fuel consumption rate is inevitably degraded by the increase in the tension of the piston rings.

Accordingly, in the cylinder liner 2 according to the present embodiment, the film 5 is formed on the high temperature liner portion 26, so that the adhesion between the cylinder block 11 and the high temperature liner portion 26 is increased. This reduces the cylinder wall temperature TW at the high temperature liner portion 26.

In the engine 1 according to the present embodiment, sufficient adhesion between the cylinder block 11 and the high temperature liner portions 26 is established, that is, little gap is created about each high temperature liner portion 26. This ensures a high thermal conductivity between the cylinder block 11 and the high temperature liner portions 26. Accordingly, the cylinder wall temperature TW in the high temperature liner portion 26 is lowered. This causes the maximum cylinder wall temperature TWH to be a maximum cylinder wall temperature TWH2, which is lower than the maximum cylinder wall temperature TWH1.

Since the consumption of the engine oil is suppressed due the reduction in the cylinder wall temperature TW, piston rings of less tension compared to those in the reference engine can be used. This improves the fuel consumption rate.

The boundary between the low temperature liner portion 27 and the high temperature liner portion 26 (wall temperature boundary 28) can be obtained based on the cylinder wall temperature TW of the reference engine. On the other hand, it has been found out that in many cases the length of the high temperature liner portion 26 (the length from the cylinder upper end 23 to the wall temperature boundary 28) is one third to one quarter of the entire length of the cylinder liner 2 (the length from the liner upper end 23 to the liner lower end 24). Therefore, when determining the position of the film 5, one third to one quarter range from the liner upper end 23 in the entire liner length may be treated as the high temperature liner portion 26 without precisely determining the wall temperature boundary 28.

[2] Thickness of Film

In the cylinder liner 2, the film 5 is formed such that its thickness TP is less than or equal to 0.5 mm. If the film thickness TP is greater than 0.5 mm, the anchor effect of the projections 3 will be reduced, resulting in a significant reduction in the bond strength between the cylinder block 11 and the high temperature liner portion 26 (the liner bond strength at the high temperature liner portion 26).

In the present embodiment, the film 5 is formed such that a mean value of the film thickness TP in a plurality of positions of the high temperature liner portion 26 is less than or equal to 0.5 mm. However, the film 5 can be formed such that the film thickness TP is less than or equal to 0.5 mm in the entire high temperature liner portion 26.

In the engine 1, as the film thickness TP is reduced, the thermal conductivity between the cylinder block 11 and the high temperature liner portion 26 is increased. Thus, when forming the film 5, it is preferable that the film thickness TP is made as close to 0 mm as possible in the entire high temperature liner portion 26.

However, since, at the present time, it is difficult to form the thickness layer that has a uniform thickness over the entire high temperature liner portion 26, some areas on the high temperature liner portion 26 will be without the film 5 if a target film thickness TP is set to an excessively small value when forming the film 5. Thus, in the present embodiment, when forming the film 5, the target film thickness TP is determined in accordance with the following conditions (A) and (B).

(A) The film 5 can be formed on the entire high temperature liner portion 26.

(B) The minimum value in a range in which the condition (A) is met.

Therefore, the film 5 is formed on the entire high temperature liner portion 26. Also, since the film thickness TP of the film 5 has a small value, the thermal conductivity between the cylinder block 11 and the high temperature liner portion 26 is increased.

[3] Formation of Film about Projection

Figure 7:
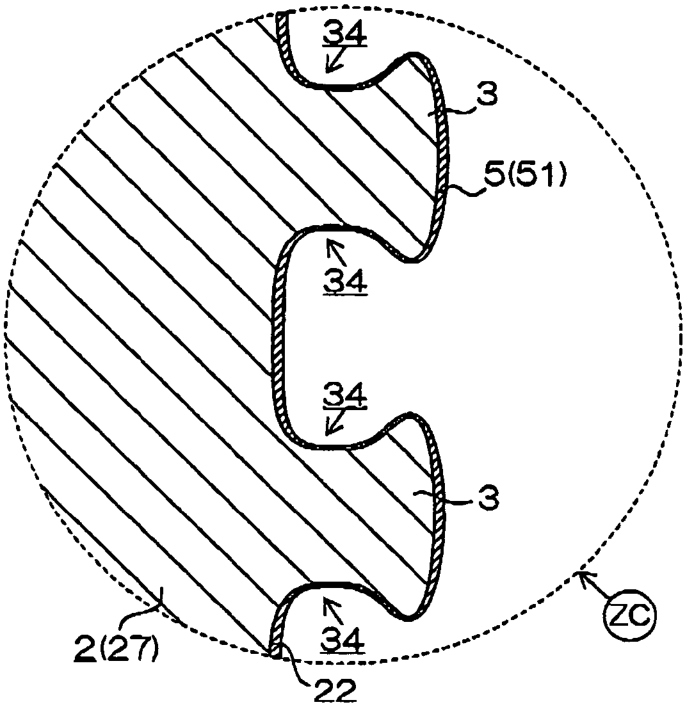
FIG. 7 is an enlarged cross-sectional view of the cylinder liner according to the first embodiment, showing encircled part ZC of FIG. 6[A]

FIG. 7 is an enlarged view showing encircled part ZC of FIG. 6[A].

In the cylinder liner 2, the film 5 is formed on the surfaces of the liner outer circumferential surface 22 and the projections 3. Also, the film 5 is formed such that the constriction spaces 34 are not filled. That is, the film 5 is formed such that, when performing the insert casting of the cylinder liners 2, the casting material fills the constriction spaces 34. If the constriction spaces 34 are filled by the film 5, the casting material will not fill the constriction spaces 34. Thus, no anchor effect of the projections 3 will be obtained.

<Bonding State of Cylinder Block and Cylinder Liner>

Figure 8:
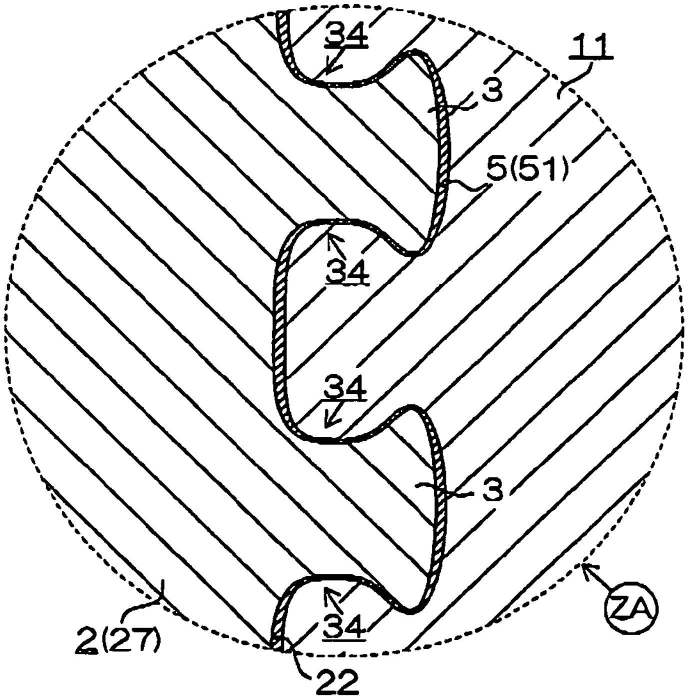
FIG. 8 is an enlarged cross-sectional view of the cylinder liner according to the first embodiment, showing encircled part ZA of FIG. 1.
Figure 9:
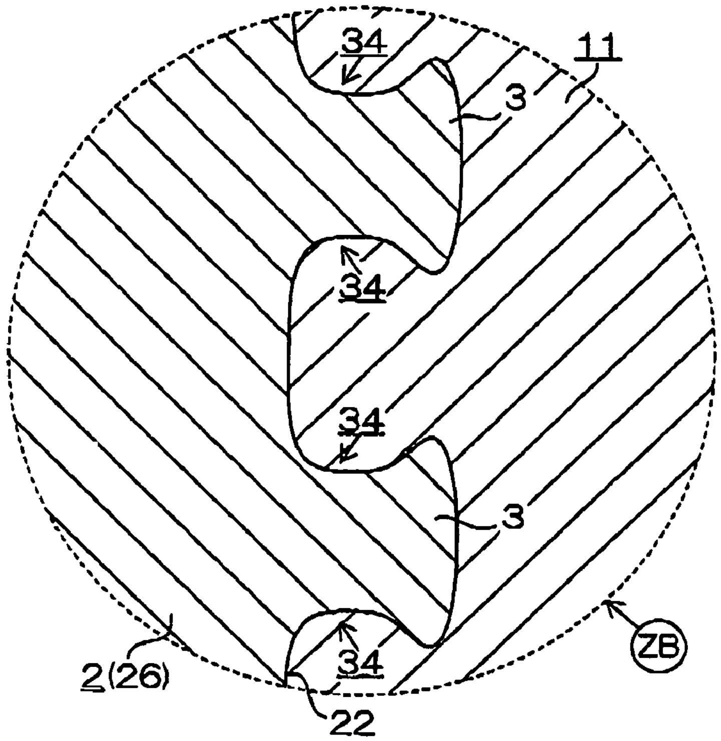
FIG. 9 is an enlarged cross-sectional view of the cylinder liner according to the first embodiment, showing encircled part 2B of FIG. 1.

Referring to FIGS. 8 and 9, the bonding state of the cylinder block 11 and the cylinder liner 2 will be described. FIGS. 8 and 9 are cross-sectional views showing the cylinder block 11 taken along the axis of the cylinder 13.

[1] Bonding State of High Temperature Liner Portion

FIG. 8 shows the bonding state between the cylinder block 11 and the high temperature liner portion 26 (cross section of part ZA of FIG. 1).

In the engine 1, the cylinder block 11 is bonded to the high temperature liner portion 26 in a state where the cylinder block 11 is engaged with the projections 3. Also, the cylinder block 11 and the high temperature liner portion 26 are bonded to each other with the film 5 in between.

As for the bonding state of the high temperature liner portion 26 and the film 5, since the film 5 is formed by spraying, the high temperature liner portion 26 and the film 5 are mechanically bonded to each other with sufficient adhesion and bond strength. The adhesion of the high temperature liner portion 26 and the film 5 is higher than the adhesion of the cylinder block and the reference cylinder liner in the reference engine.

As for the bonding state of the cylinder block 11 and the film 5, the film 5 is formed of an Al—Si alloy that has a melting point lower than the reference molten metal temperature TC and a high wettability with the casting material of the cylinder block 11. Thus, the cylinder block 11 and the film 5 are mechanically bonded to each other with sufficient adhesion and bond strength. The adhesion of the cylinder block 11 and the film 5 is higher than the adhesion of the cylinder block and the reference cylinder liner in the reference engine.

In the engine 1, since the cylinder block 11 and the high temperature liner portion 26 are bonded to each other in this state, the following advantages are obtained.

(A) Since the film 5 ensures the adhesion between the cylinder block 11 and the high temperature liner portion 26, the thermal conductivity between the cylinder block 11 and the high temperature liner portion 26 is increased.

(B) Since the film 5 ensures the bond strength between the cylinder block 11 and the high temperature liner portion 26, exfoliation of the cylinder block 11 and the high temperature liner portion 26 is suppressed. Therefore, even if the cylinder bore 15 is expanded, the adhesion of the cylinder block 11 and the high temperature liner portion 26 is maintained. This suppresses the reduction in the thermal conductivity.

(C) Since the projections 3 ensures the bond strength between the cylinder block 11 and the high temperature liner portion 26, exfoliation of the cylinder block 11 and the high temperature liner portion 26 is suppressed. Therefore, even if the cylinder bore 15 is expanded, the adhesion of the cylinder block 11 and the high temperature liner portion 26 is maintained. This suppresses the reduction in the thermal conductivity.

In the engine 1, as the adhesion between the cylinder block 11 and the film 5 and the adhesion between the high temperature liner portion 26 and the film 5 are lowered, the amount of gap between these components is increased. Accordingly, the thermal conductivity between the cylinder block 11 and the high temperature liner portion 26 is reduced. As the bond strength between the cylinder block 11 and the high film 5 and the bond strength between the high temperature liner portion 26 and the film 5 are reduced, it is more likely that exfoliation occurs between these components. Therefore, when the cylinder bore 15 is expanded, the adhesion between the cylinder block 11 and the high temperature liner portion 26 is reduced.

In the cylinder liner 2 according to the present embodiment, the melting point of the film 5 is less than or equal to the reference molten metal temperature TC. Thus, it is believed that, when producing the cylinder block 11, the film 5 is melt and metallurgically bonded to the casting material. However, according to the results of tests performed by the present inventors, it was confirmed that the cylinder block 11 as described above was mechanically bonded to the film 5. Further, metallurgically bonded portions were found. However, cylinder block 11 and the film 5 were mainly bonded in a mechanical manner.

Through the tests, the inventors also found out the following. That is, even if the casting material and the film 5 were not metallurgically bonded (or only partly bonded in a metallurgical manner), the adhesion and the bond strength of the cylinder block 11 and the high temperature liner portion 26 were increased as long as the film 5 had a melting point less than or equal to the reference molten metal temperature TC. Although the mechanism has not been accurately elucidated, it is believed that the rate of solidification of the casting material is reduced due to the fact that the heat of the casting material is not smoothly removed by the film 5.

[2] Bonding State of Low Temperature Liner Portion

FIG. 9 shows the bonding state between the cylinder block 11 and the low temperature liner portion 27 (cross section of part 2B of FIG. 1).

In the engine 1, the cylinder block 11 is bonded to the high temperature liner portion 26 in a state where the cylinder block 11 is engaged with the projections 3. Therefore, sufficient thermal bond strength between the cylinder block 11 and the low temperature liner portion 27 is ensured by the anchor effect of the projections 3. Also, exfoliation of the cylinder block 11 and the low temperature liner portion 27 from each other when the cylinder bore 15 is expanded is prevented.

<Formation of Projection>

Referring to Table 1, the formation of the projections 3 on the cylinder liner 2 will be described.

As parameters representing the formation state of the projection 3 (formation state parameters), a first area ratio SA, a second area ratio SB, a standard cross-sectional area SD, a standard number of projections NP, and a standard projection length HP are defined.

A measurement height H, a first reference plane PA, and a second reference plane PB, which are basic values for the above formation state parameters, will now be described.

(a) The measurement height H represents the distance from the liner outer circumferential surface 22 along the axial direction of the projection 3 (the height of the projection 3). At the liner outer circumferential surface 22, the measurement height H is 0 mm. At the top surface 32A of the projection 3, the measurement height H has the maximum value.

(b) The first reference plane PA represents a plane that lies along the radial direction of the projection 3 at the position of the measurement height of 0.4 mm.

(c) The second reference plane PB represents a plane that lies along the radial direction of the projection 3 at the position of the measurement height of 0.2 mm.

The formation state parameters will now be described.

[A] The first area ratio SA represents the ratio of the area of the projections 3 in the first reference plane PA above the liner outer circumferential surface 22 (radial direction cross-sectional area SR).

[B] The second area ratio SB represents the ratio of the area of the projections 3 in the second reference plane PB above the liner outer circumferential surface 22 (radial direction cross-sectional area SR).

[C] The standard cross-sectional area SD represents the area of one projection 3 in the first reference plane PA above the liner outer circumferential surface 22 (radial direction cross-sectional area SR).

[D] The standard projection number NP represents the number of the projections 3 formed in a unit area on the liner outer circumferential surface 22 (1 $cm^2$).

[E] The standard projection length HP represents a mean value of the values of the measurement height H of the projections 3 at a plurality of positions.

TABLE 1

| | Type of Parameter | Selected Range | Unit |
|---|---|---|---|
| [A] | First area ratio SA | 10-50 | [%] |
| [B] | Second Area Ratio SB | 20-55 | [%] |
| [C] | Standard Cross-Sectional Area SD | 0.2-3.0 | [$mm^2$] |
| [D] | Standard Projection Number NP | 5-60 | [number/$cm^2$] |
| [E] | Standard Projection Length HP | 0.5-1.0 | [mm] |

In the present embodiment, the formation state parameters [A] to [E] are set to be within the selected ranges in Table 1, so that the liner bond strength of the projections 3 and the filling factor of the casting material between the projections 3 are increased. Since the filling factor of casting material is increased, gaps are unlikely to be created between the cylinder block 11 and the cylinder liners 2. The cylinder block 11 and the cylinder liners 2 are bonded while closing contacting each other.

In the present embodiment, other than setting of the above listed parameters [A] to [E], the cylinder liner 2 is formed such that the projections 3 are each independently formed on the first reference plane PA. This further increases the adhesion.

<Method for Producing Cylinder Liner>

Figure 10:
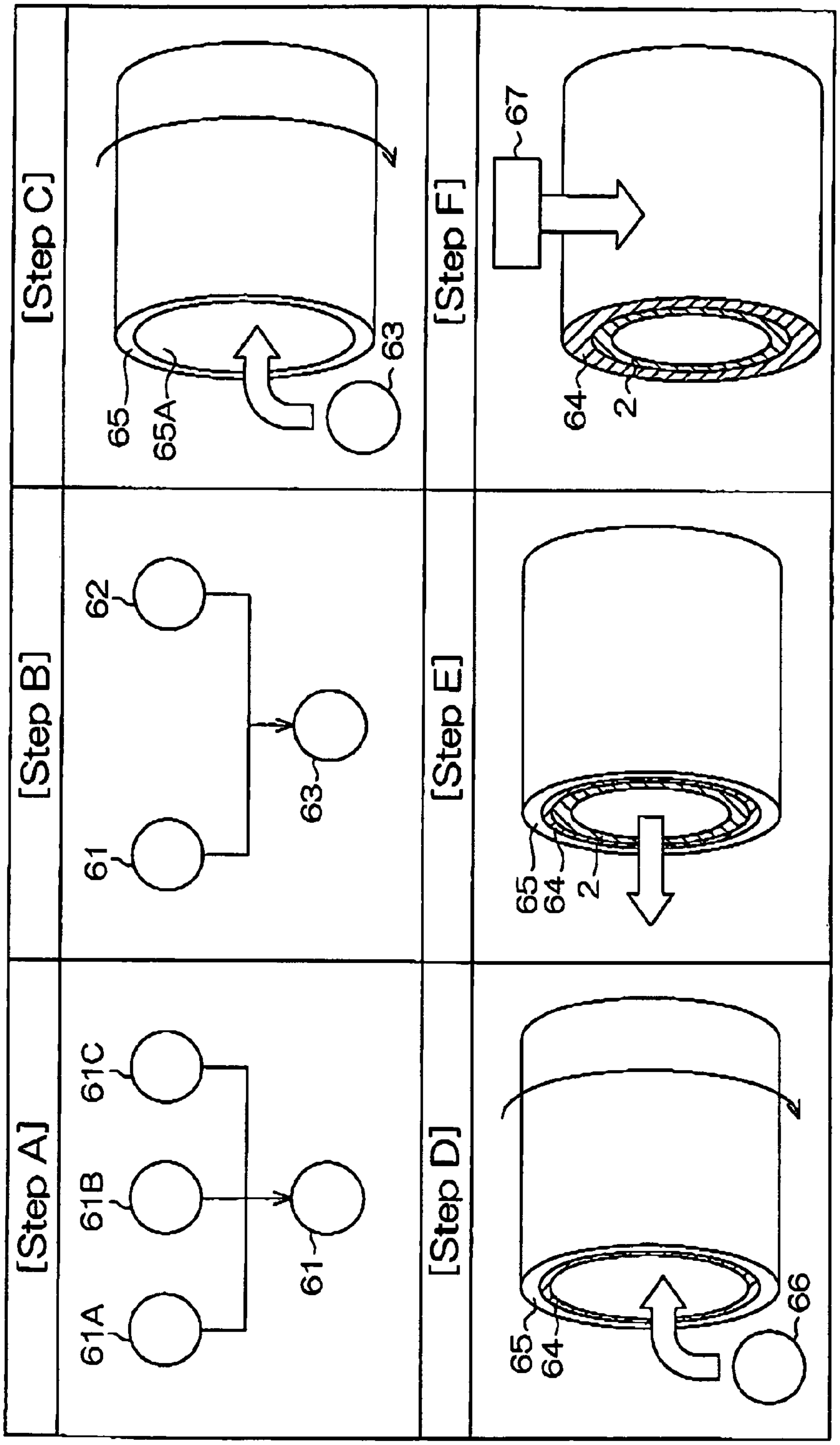
FIG. 10 is a process diagram showing steps for producing a cylinder liner through the centrifugal casting.
Figure 11:
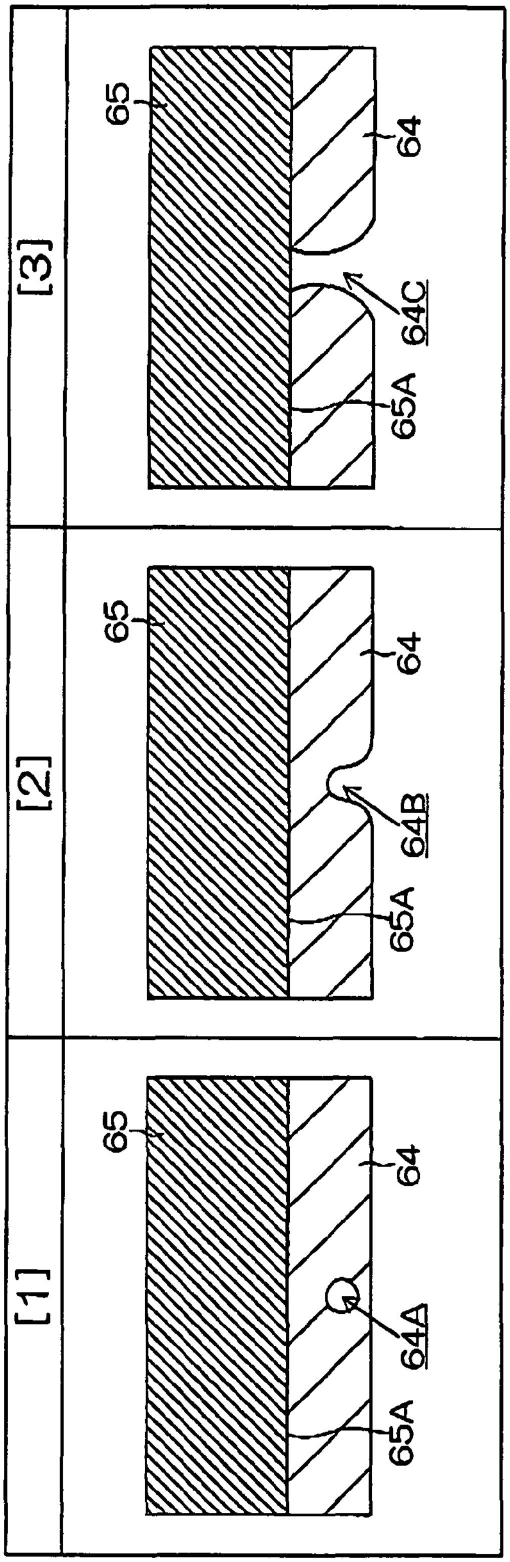
FIG. 11 is a process diagram showing steps for forming a recess having a constricted shape in a mold wash layer in the production of the cylinder liner through the centrifugal casting.

Referring to FIGS. 10 and 11, a method for producing the cylinder liner 2 will be described.

In the present embodiment, the cylinder liner 2 is produced by centrifugal casting. To make the above listed formation state parameters fall in the selected ranges of Table 1, parameters of the centrifugal casting (the following parameters [A] to [F]) are set be within selected range of Table 2.

[A] The composition ratio of a refractory material 61A in a suspension 61.

[B] The composition ratio of a binder 61B in the suspension 61.

[C] The composition ratio of water 61C in the suspension 61.

[D] The average particle size of the refractory material 61A.

[E] The composition ratio of added surfactant 62 to the suspension 61.

[F] The thickness of a mold wash 63 (mold wash layer 64).

TABLE 2

| | Type of parameter | Selected range | Unit |
|---|---|---|---|
| [A] | Composition ratio of refractory material | 8-30 | [% by mass] |
| [B] | Composition ratio of binder | 2-10 | [% by mass] |
| [C] | Composition ratio of water | 60-90 | [% by mass] |

TABLE 2-continued

| | Type of parameter | Selected range | Unit |
|---|---|---|---|
| [D] | Average particle size of refractory material | 0.02-0.1 | [mm] |
| [E] | Composition ratio of surfactant | $0.005 < x \leqq 0.1$ | [% by mass] |
| [F] | Thickness of mold wash layer | 0.5 to 1.0 | [mm] |

The production of the cylinder liner 2 is executed according to the procedure shown in FIG. 10.

[Step A] The refractory material 61A, the binder 61B, and the water 61C are compounded to prepare the suspension 61. In this step, the composition ratios of the refractory material 61A, the binder 61B, and the water 61C, and the average particle size of the refractory material 61A are set to fall within the selected ranges in Table 2.

[Step B] A predetermined amount of the surfactant 62 is added to the suspension 61 to obtain the mold wash 63. In this step, the ratio of the added surfactant 62 to the suspension 61 is set to fall within the selected range shown in Table 2.

[Step C] After heating a rotating mold 65 to a predetermined temperature, the mold wash 63 is applied through spraying on an inner circumferential surface of the mold 65 (mold inner circumferential surface 65A). At this time, the mold wash 63 is applied such that a layer of the mold wash 63 (mold wash layer 64) of a substantially uniform thickness is formed on the entire mold inner circumferential surface 65A. In this step, the thickness of the mold wash layer 64 is set to fall within the selected range shown in Table 2.

In the mold wash layer 64 of the mold 65, holes having a constricted shape are formed after [Step C].

Referring to FIG. 11, the formation of the holes having a constricted shape will be described.

[1] The mold wash layer 64 with a plurality of bubbles 64A is formed on the mold inner circumferential surface 65A of the mold 65.

[2]) The surfactant 62 acts on the bubbles 64A to form recesses 64B in the inner circumferential surface of the mold wash layer 64.

[3] The bottom of the recess 64B reaches the mold inner circumferential surface 65A, so that a hole 64C having a constricted shape is formed in the mold wash layer 64.

[Step D] After the mold wash layer 64 is dried, molten metal 66 of cast iron is poured into the mold 65, which is being rotated. At this time, the molten metal 66 flows into the hole 64C having a constricted shape in the mold wash layer 64. Thus, the projections 3 having a constricted shape are formed on the cast cylinder liner 2.

[Step E] After the molten metal 66 is hardened and the cylinder liner 2 is formed, the cylinder liner 2 is taken out of the mold 65 with the mold wash layer 64.

[Step F] Using a blasting device 67, the mold wash layer 64 (mold wash 63) is removed from the outer circumferential surface of the cylinder liner 2.

<Method for Measuring Formation State Parameters>

Figure 12:
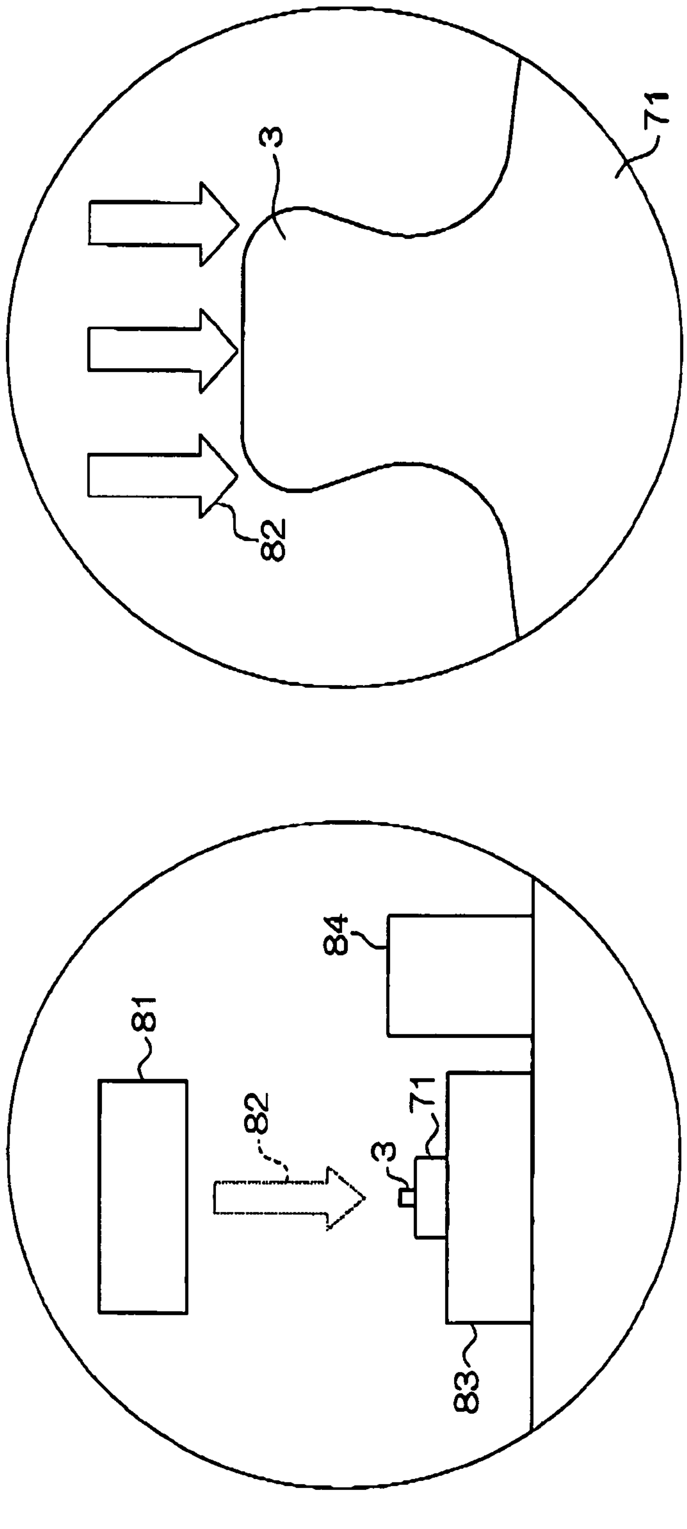
FIG. 12 is a diagram showing one example of the procedure for measuring parameters of the cylinder liner according to the first embodiment, using a three-dimensional laser.

Referring to FIG. 12, a method for measuring the formation state parameters using a three-dimensional laser will be described. The standard projection length HP is measured by another method.

Each of the formation state parameters can be measured in the following manner.

[1] A test piece 71 for measuring parameters of projections is made from the cylinder liner 2.

[2] In a noncontact three-dimensional laser measuring device 81, the test piece 71 is set on a test bench 83 such that the axial direction of the projections 3 is substantially parallel to the irradiation direction of laser light 82 (FIG. 12[A]).

[3] The laser light 82 is irradiated from the three-dimensional laser measuring device 81 to the test piece 71 (FIG. 12[B]).

[4] The measurement results of the three-dimensional laser measuring device 81 are imported into an image processing device 84.

[5] Through the image processing performed by the image processing device 84, a contour diagram 85 (FIG. 13) of the projection 3 is displayed. The formation state parameters are computed based on the contour diagram 85.

<Contour Lines of Projections>

Figure 13:
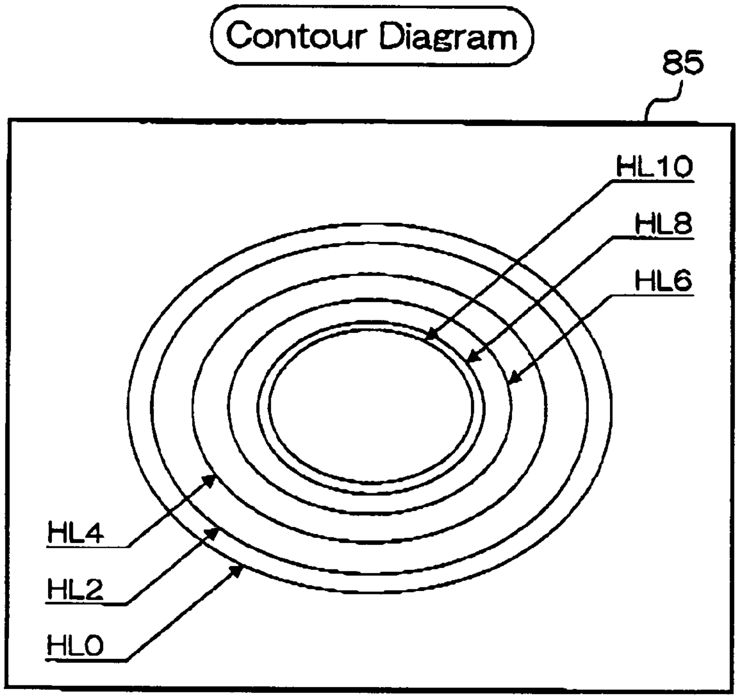
FIG. 13 is a diagram showing contour lines of the cylinder liner according to the first embodiment, obtained through measurement using a three-dimensional laser.
Figure 14:
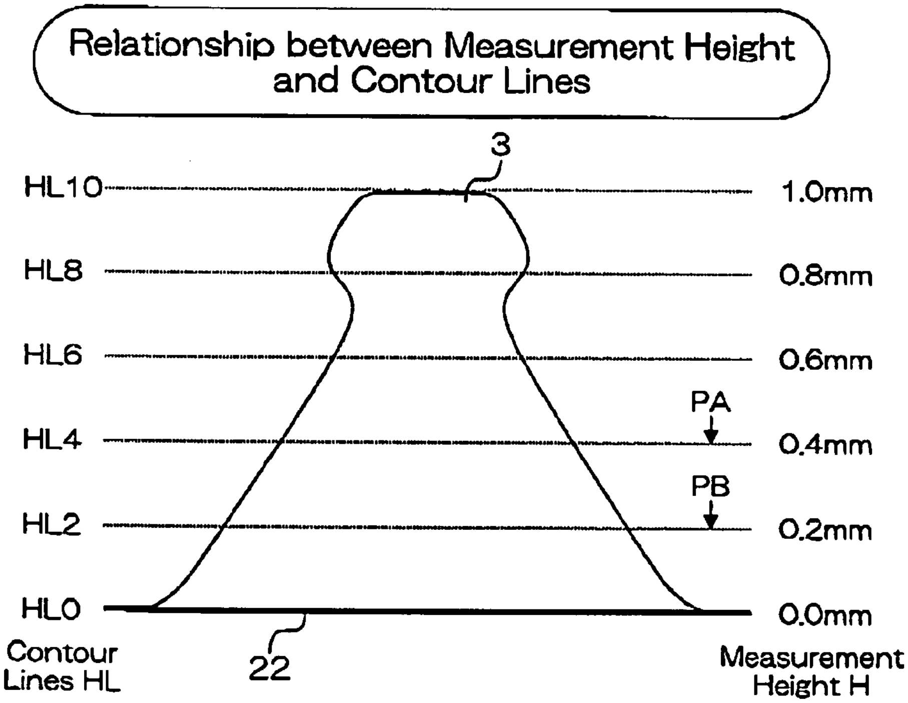
FIG. 14 is a diagram showing the relationship between the measured height and the contour lines of the cylinder liner of the first embodiment.

Referring to FIGS. 13 and 14, the contour diagram 85 will be explained. FIG. 13 is one example of the contour diagram 85. FIG. 14 shows the relationship between the measurement height H and contour lines HL. The contour diagram 85 of FIG. 13 shows a different projection 3 from that shown in FIG. 14.

In the contour diagram 85, the contour lines HL are shown at every predetermined value of the measurement height H.

For example, in the case where the contour lines HL are shown at a 0.2 mm interval from the measurement height of 0 mm to the measurement height of 1.0 mm in the contour diagram 85, a contour line HL0 of the measurement height of 0 mm, a contour line HL2 of the measurement height of 0.2 mm, a contour line HL4 of the measurement height of 0.4 mm, a contour line HL6 of the measurement height of 0.6 mm, a contour line HL8 of the measurement height of 0.8 mm, and a contour line HL10 of the measurement height of 1.0 mm are shown.

In FIG. 14, the contour line HL 4 corresponds to the first reference plane PA. Also, the contour line HL 2 corresponds to the second reference plane PB. Although FIG. 14 shows a diagram in which the contour lines HL are shown at a 0.2 mm interval, the distance between the contour lines HL may be changed as necessary in the actual contour diagram 85.

Figure 15:
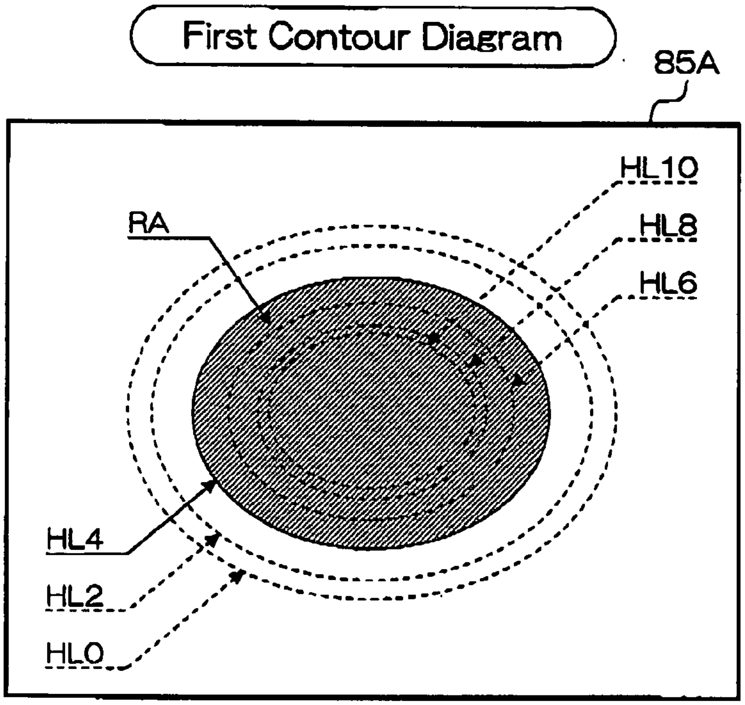
FIG. 15 is a diagram showing contour lines of the cylinder liner according to the first embodiment, obtained through measurement using a three-dimensional laser.
Figure 16:
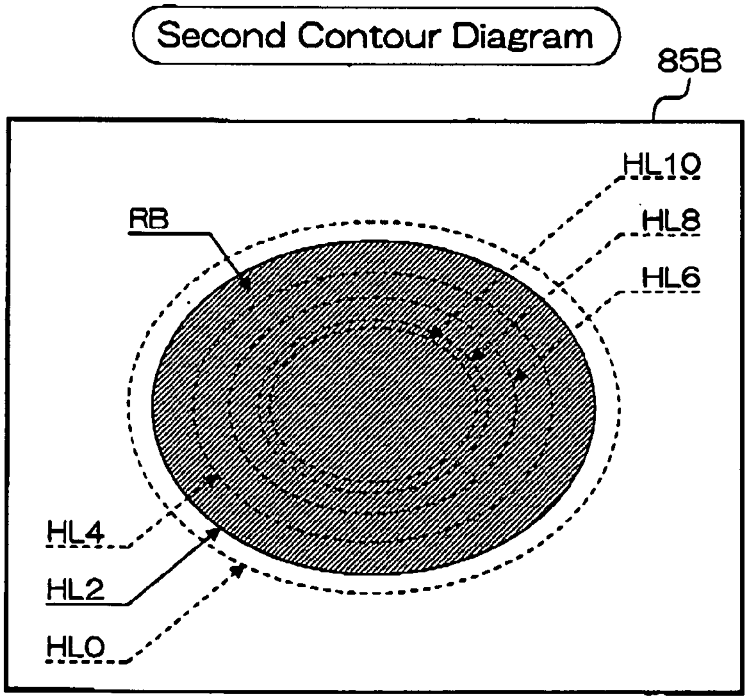
FIG. 16 is a diagram showing contour lines of the cylinder liner according to the first embodiment, obtained through measurement using a three-dimensional laser.

Referring to FIGS. 15 and 16, a first region RA and a second region RB in the contour diagram 85 will be described. FIG. 15 is a contour diagram 85 (first contour diagram 85A) in which the contour lines other than the contour lines HL4 of the measurement height 0.4 mm are shown in dotted lines. FIG. 16 is a contour diagram 85 (second contour diagram 85B) in which the contour lines other than the contour lines HL2 of the measurement height 0.2 mm are shown in dotted lines. In FIGS. 15 and 16, solid lines represent the shown contour lines HL, broken lines represent the other contour lines HL.

In the present embodiment, a region surrounded by the contour line HL4 in the contour diagram 85 is defined as the first region RA. That is, the shaded area in the first contour diagram 85A corresponds to the first region RA. A region surrounded by the contour line HL2 in the contour diagram 85 is defined as the second region RB. That is, the shaded area in the second contour diagram 85B corresponds to the second region RB.

<Method for Computing Formation State Parameters>

The formation state parameters are computed in the following manner based on the contour diagram 85.

[A] First Area Ratio SA

The first area ratio SA is computed as the ratio of the first region RA in the area of the contour diagram 85. That is, the first area ratio SA is computed by using the following formula.

$$SA=SRA/ST\times100[\%]$$

In the above formula, the symbol ST represents the area of the entire contour diagram 85. The symbol SRA represents the total area obtained by adding the area of the first region RA. For example, when the first contour diagram 85A of FIG. 15 is used as a model, the area of the rectangular zone corresponds to the area ST. The area of the shaded zone corresponds to the area SRA. When computing the first area ratio SA, the contour diagram 85 is assumed to include only the liner outer circumferential surface 22.

[B] Second Area Ratio SB

The second area ratio SB is computed as the ratio of the second region RB in the area of the contour diagram 85. That is, the second area ratio SB is computed by using the following formula.

$$SB=SRB/ST\times100[\%]$$

In the above formula, the symbol ST represents the area of the entire contour diagram 85. The symbol SRB represents the total area obtained by adding up the area of the second region RB. For example, when the second contour diagram 85B of FIG. 16 is used as a model, the area of the rectangular zone corresponds to the area ST. The area of the shaded zone corresponds to the area SRB. When computing the second area ratio SB, the contour diagram 85 is assumed to include only the liner outer circumferential surface 22.

[C] Standard Cross-sectional Area SD

The standard cross-sectional area SD can be computed as the area of each first region RA in the contour diagram 85. For example, when the first contour diagram 85A of FIG. 15 is used as a model, the area of the shaded area corresponds to standard cross-sectional area SD.

[D] Standard Projection Number NP

The standard projection number NP can be computed as the number of projections 3 per unit area in the contour diagram 85 (1 $cm^2$). For example, when the first contour diagram 85A of FIG. 15 or the second contour diagram 85B of FIG. 16 is used as a model, the number of projection in each drawing (one) corresponds to the standard projection number NP. In the cylinder liner 2 of the present embodiment, five to sixty projections 3 are formed per unit area (1 $cm^2$). Thus, the actual standard projection number NP is different from the reference projection numbers of the first contour diagram 85A and the second contour diagram 85B.

[E] Standard Projection Length HP

The standard projection length HP may be the height of one of the projections 3 or may be computed as a mean value of the heights of one of the projections 3 at a plurality of locations. The height of the projections 3 can be measured by a measuring device such as a dial depth gauge.

Whether the projections 3 are independently provided on the first reference plane PA can be checked based on the first region RA in the contour diagram 85. That is, when the first region RA does not interfere with other first regions RA, it is confirmed that the projections 3 are independently provided on the first reference plane PA.

EXAMPLES

Hereinafter, the present invention will be described based on comparison between examples and comparison examples.

In each of the examples and the comparison examples, cylinder liners were produced by the producing method of the above described embodiment (centrifugal casting). When producing cylinder liners, the material property of casting iron was set to correspond to FC230, and the thickness of the finished cylinder liner was set to 2. 3 mm.

Table 3 shows the characteristics of cylinder liners of the examples. Table 4 shows the characteristics of cylinder liners of the comparison examples.

TABLE 3

| | Characteristics of Cylinder Liner |
|---|---|
| Example 1 | (1) Form a film by a sprayed layer of Al—Si alloy<br>(2) Set the first area ratio to a lower limit value (10%) |
| Example 2 | (1) Form a film by a sprayed layer of Al—Si alloy<br>(2) Set the second area ratio to an upper limit value (55%) |
| Example 3 | (1) Form a film by a sprayed layer of Al—Si alloy<br>(2) Set the film thickness to 0.005 mm |
| Example 4 | (1) Form a film by a sprayed layer of Al—Si alloy<br>(2) Set the film thickness to an upper limit value (0.5 mm) |

TABLE 4

| | Characteristics of cylinder liner |
|---|---|
| Comparison example 1 | (1) No film is formed.<br>(2) Set the first area ratio to a lower limit value (10%). |
| Comparison example 2 | (1) No film is formed.<br>(2) Set the second area ratio to an upper limit value (55%). |
| Comparison example 3 | (1) Form a film by a sprayed layer of Al—Si alloy<br>(2) No projection with constriction is formed. |
| Comparison example 4 | (1) Form a film by a sprayed layer of Al—Si alloy.<br>(2) Set the first area ratio to a value lower than the lower limit value (10%). |
| Comparison example 5 | (1) Form a film by a sprayed layer of Al—Si alloy.<br>(2) Set the second area ratio to a value higher than the upper limit value (55%). |
| Comparison example 6 | (1) Form a film by a sprayed layer of Al—Si alloy.<br>(2) Set the film thickness to a value greater than the upper limit value (0.5 mm). |

Producing conditions of cylinder liners specific to each of the examples and comparison examples are shown below. Other than the following specific conditions, the producing conditions are common to all the examples and the comparison examples.

In the example 1 and the comparison example 1, parameters related to the centrifugal casting ([A] to [F] in Table 2) were set in the selected ranges shown in Table 2 so that the first area ratio SA becomes the lower limit value (10%).

In the example 2 and the comparison example 2, parameters related to the centrifugal casting ([A] to [F] in Table 2)

were set in the selected ranges shown in Table 2 so that the second area ratio SB becomes the upper limit value (55%).

In the examples 3 and 4, and the comparison example 6, parameters related to the centrifugal casting ([A] to [F] in Table 2) were set to the same values in the selected ranges shown in Table 2.

In the comparison example 3, casting surface was removed after casting to obtain a smooth outer circumferential surface.

In the comparison example 4, at least one of the parameters related to the centrifugal casting ([A] to [F] in Table 2) was set outside of the selected range in Table 2 so that the first area ratio SA becomes less than the lower limit value (10%).

In the comparison example 5, at least one of the parameters related to the centrifugal casting ([A] to [F] in Table 2) was set outside of the selected range in Table 2 so that the second area ratio SB becomes more than the upper limit value (55%).

The conditions for forming films are shown below.

The film thickness TP was set the same value in the examples 1 and 2, and the comparison examples 3, 4 and 5.

In the example 4, the film thickness TP was set to the upper limit value (0.5 mm).

In the comparison examples 1 and 2, no film was formed.

In the comparison example 6, the film thickness TP was set to a value greater than the upper limit value (0.5 mm).

<Method for Measuring Formation State Parameters>

The measuring method of the formation state parameters in each of the examples and the comparison examples will now be explained.

In each of the examples and comparison examples, parameters related to the formation state of the projections 3 were measured according to the method for computing formation state parameters of the above described embodiment.

<Method for Measuring Film Thickness>

The measuring method of the film thickness TP in each of the examples and the comparison examples will now be explained.

In each of the examples and the comparison examples, the film thickness TP was measured with a microscope. Specifically, the film thickness TP was measured according to the following processes [1] and [2].

[1] A test piece for measuring the film thickness is made from the cylinder liner 2, on which the film 5 has been formed.

[2] The thickness is measured at several positions of the film 5 in the test piece using a microscope, and the mean value of the measured values is computed as a measured value of the film thickness TP.

<Method for Measuring Bond Strength>

Figure 17:
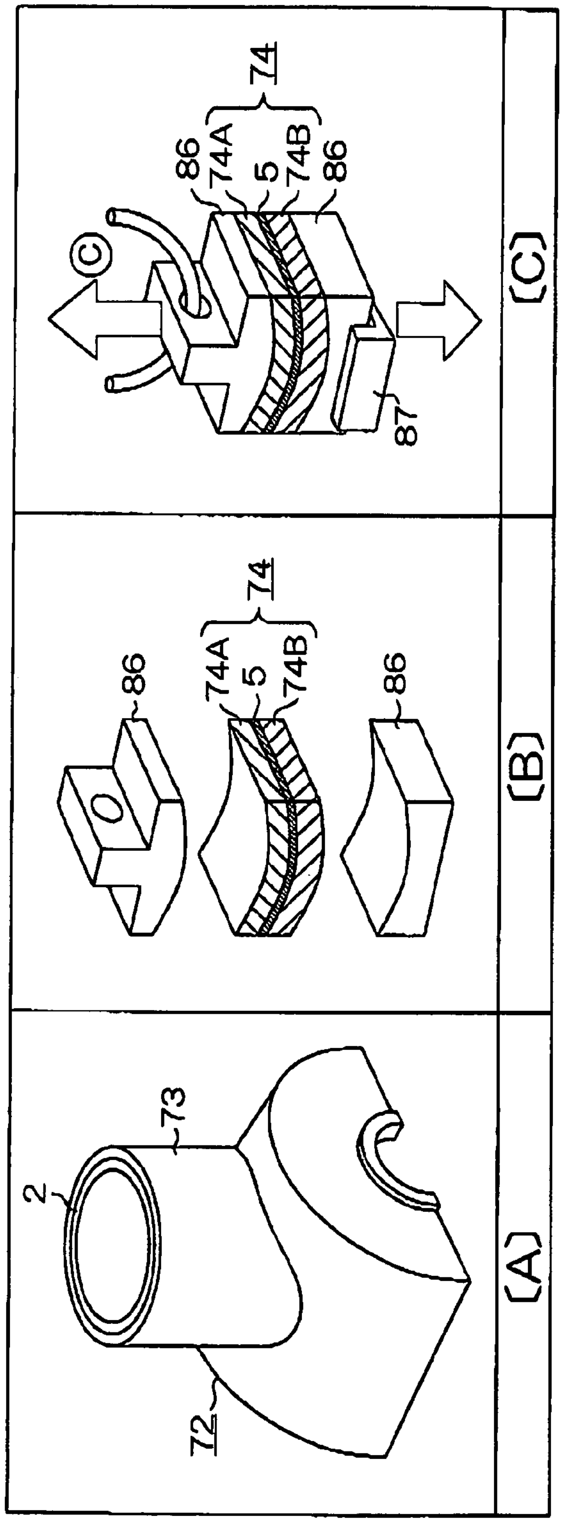
FIG. 17 is a diagram showing one example of a procedure of a tensile test for evaluating the bond strength of the cylinder liner according to the first embodiment in a cylinder block.

Referring to FIG. 17, a method for evaluating the liner bond strength in each of the examples and the comparison examples will be explained.

In each of the examples and the comparison examples, tensile test was adopted as a method for evaluating the liner bond strength. Specifically, the evaluation of the liner bond strength was performed according to the following processes [1] and [5].

[1] Single cylinder type cylinder blocks 72, each having a cylinder liner 2, were produced through die casting (FIG. 17[A]).

[2] Test pieces 74 for strength evaluation were made from the single cylinder type cylinder blocks 72. The strength evaluation test pieces 74 were each formed of a part of the cylinder liner 2 (liner piece 74A) and an aluminum part of the cylinder 73 (aluminum piece 74B). The film 5 is formed between each liner piece 74A and the corresponding aluminum piece 74B.

[3] Arms 86 of a tensile test device were bonded to the strength evaluation test piece 74 (the liner piece 74A and the aluminum piece 74B (FIG. 17[B]).

[4] After one of the arms 86 was held by a clamp 87, a tensile load was applied to the strength evaluation test piece 74 by the other arm 86 such that liner piece 74A and the aluminum piece 74B were exfoliated in a radial direction of the cylinder (along a direction of arrow C in FIG. 17[C]).

[5] Through the tensile test, the strength at which the liner piece 74A and the aluminum piece 74B were exfoliated (load per unit area) was obtained as the liner bond strength.

TABLE 5

| | Type of Parameter | Setting |
|---|---|---|
| [A] | Aluminum Material | ADC12 |
| [B] | Casting Pressure | 55 [Mpa] |
| [C] | Casting Speed | 1.7 [m/s] |
| [D] | Casting Temperature | 670 [° C.] |
| [E] | Cylinder Thickness | 4.0 [mm] |

[E] represents the thickness without the cylinder liner

In each of the examples and the comparison examples, the single cylinder type cylinder block 72 for evaluation was produced under the conditions shown in Table 5.

<Method for Evaluating Thermal Conductivity>

Figure 18:
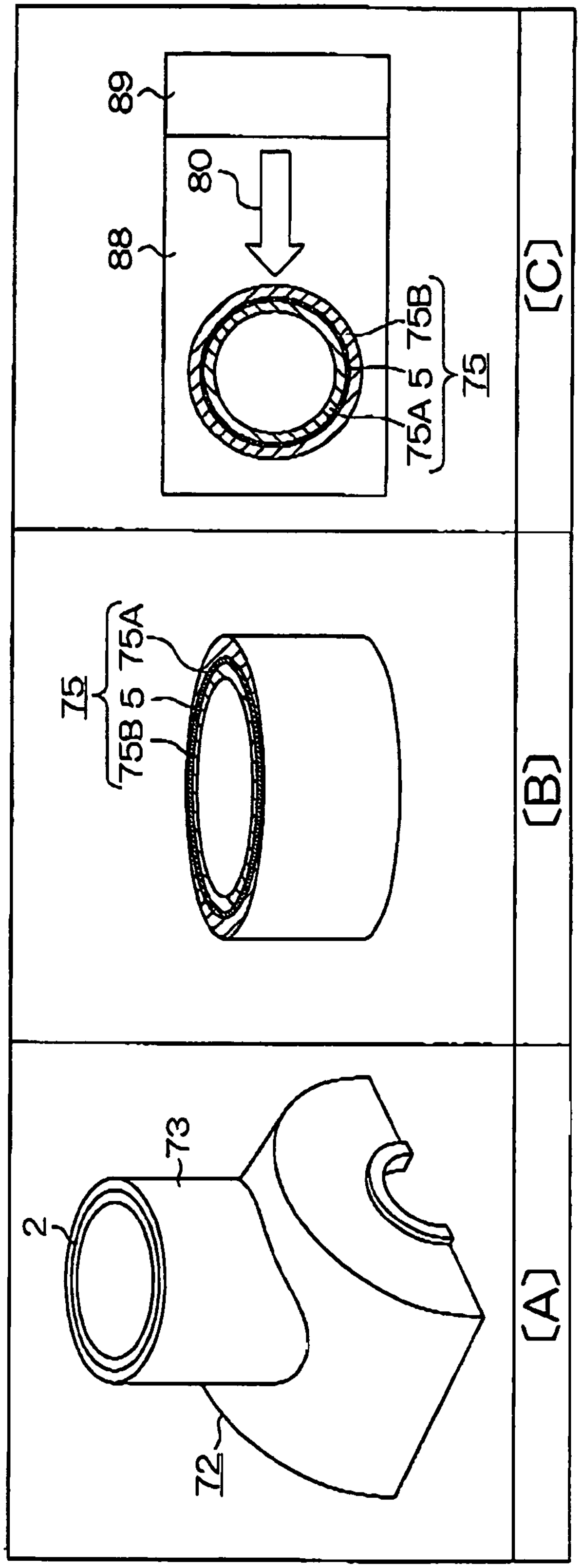
FIG. 18 is a diagram showing one example of a procedure of a laser flash method for evaluating the thermal conductivity of the cylinder block having the cylinder liner according to the first embodiment.

Referring to FIG. 18, a method for evaluating the cylinder thermal conductivity (thermal conductivity between the cylinder block 11 and the high temperature liner portion 26) in each of the examples and the comparison examples will be explained.

In each of the examples and the comparison examples, the laser flash method was adopted as the method for evaluating the cylinder thermal conductivity. Specifically, the evaluation of the thermal conductivity was performed according to the following processes [1] and [4].

[1] Single cylinder type cylinder blocks 72, each having a cylinder liner 2, were produced through die casting (FIG. 18[A]).

[2] Annular test pieces 75 for thermal conductivity evaluation were made from the single cylinder type cylinder blocks 72 (FIG. 18[B]). The thermal conductivity evaluation test pieces 75 were each formed of a part of the cylinder liner 2 (liner piece 75A) and an aluminum part of the cylinder 73 (aluminum piece 75B). The film 5 is formed between each liner piece 75A and the corresponding aluminum piece 75B.

[3] After setting the thermal conductivity evaluation test piece 75 in a laser flash device 88, laser light 80 is irradiated from a laser oscillator 89 to the outer circumference of the test piece 75 (FIG. 18[C]).

[4] Based on the test results measured by the laser flash device 88, the thermal conductivity of the thermal conductivity evaluation test piece 75 was computed.

TABLE 6

| | Type of Parameter | Setting |
|---|---|---|
| [A] | Liner Piece Thickness | 1.35 [mm] |
| [B] | Aluminum Piece Thickness | 1.65 [mm] |

TABLE 6-continued

| | Type of Parameter | Setting |
|---|---|---|
| [C] | Outer Diameter of Test Piece | 10 [mm] |

In each of the examples and the comparison examples, the single cylinder type cylinder block 72 for evaluation was produced under the conditions shown in Table 5. The thermal conductivity evaluation test piece 75 was produced under the conditions shown in Table 6. Specifically, a part of the cylinder 73 was cut out from the single cylinder type cylinder block 72. The outer and inner circumferential surfaces of the cut out part were machined such that the thicknesses of the liner piece 75A and the aluminum piece 75B were the values shown in Table 6.

<Measurement Results>

Table 7 shows the measurement results of the parameters in the examples and the comparison examples. The values in the table are each a representative value of several measurement results.

TABLE 7

| | First Area Ratio [%] | Second Area Ratio [%] | Reference Projection Number [Number/cm$^2$] | Reference Projection Length [mm] | Film Material | Film Thickness [mm] | Bond Strength [Mpa] | Thermal Conductivity [w/mk] |
|---|---|---|---|---|---|---|---|---|
| Example 1 | 10 | 20 | 20 | 0.6 | Al—Si alloy | 0.08 | 35 | 50 |
| Example 2 | 50 | 55 | 60 | 1.0 | Al—Si alloy | 0.08 | 55 | 50 |
| Example 3 | 20 | 35 | 35 | 0.7 | Al—Si alloy | 0.005 | 50 | 60 |
| Example 4 | 20 | 35 | 35 | 0.7 | Al—Si alloy | 0.5 | 45 | 55 |
| Comparison Example 1 | 10 | 20 | 20 | 0.6 | No film | — | 17 | 25 |
| Comparison Example 2 | 50 | 55 | 60 | 1.0 | No film | — | 52 | 25 |
| Comparison Example 3 | 0 | 0 | 0 | 0 | Al—Si alloy | 0.08 | 22 | 60 |
| Comparison Example 4 | 2 | 10 | 3 | 0.3 | Al—Si alloy | 0.08 | 15 | 40 |
| Comparison Example 5 | 25 | 72 | 30 | 0.8 | Al—Si alloy | 0.08 | 40 | 35 |
| Comparative Example 6 | 20 | 35 | 35 | 0.7 | Al—Si alloy | 0.6 | 10 | 30 |

The advantages recognized based on the measurement results will now be explained.

By contrasting the examples 1 to 4 with the comparison example 3, the following facts were discovered. Formation of the projections 3 on the cylinder liner 2 increases the liner bond strength.

By contrasting the example 1 with the comparison example 1, the following facts were discovered. That is, formation of the film 5 on the high temperature liner portion 26 increases the thermal conductivity between the cylinder block 11 and the high temperature liner portion 26. Also, the liner bond strength is increased.

By contrasting the example 2 with the comparison example 2, the following facts were discovered. That is, formation of the film 5 on the high temperature liner portion 26 increases the thermal conductivity between the cylinder block 11 and the high temperature liner portion 26. Also, the liner bond strength is increased.

By contrasting the example 4 with the comparison example 6, the following facts were discovered. That is, formation of the film 5 having thickness TP less than or equal to the upper value (0.5 mm) increases the thermal conductivity between the cylinder block 11 and the high temperature liner portion 26. Also, the liner bond strength is increased.

By contrasting the example 1 with the comparison example 4, the following facts were discovered. That is, forming the projections 3 such that the first area ratio SA is more than or equal to the lower limit value (10%) increases the liner bond strength. Also, the thermal conductivity between the cylinder block 11 and the high temperature liner portion 26 is increased.

By contrasting the example 2 with the comparison example 5, the following facts were discovered. That is, forming the projections 3 such that the second area ratio SB is less than or equal to the upper limit value (55%) increases the liner bond strength. Also, the thermal conductivity between the cylinder block 11 and the high temperature liner portion 26 is increased.

By contrasting the example 3 with the example 4, the following facts were discovered. That is, forming the film 5 while reducing the film thickness TP increases the liner bond strength. Also, the thermal conductivity between the cylinder block 11 and the high temperature liner portion 26 is increased.

Advantages of Embodiment

The cylinder liner according to the present embodiment provides the following advantages.

(1) According to the cylinder liner 2 of the present embodiment, when producing the cylinder block 11 through insert casting, the casting material of the cylinder block 11 and the projections 3 are engaged with each other so that sufficient bond strength of these components are ensured. This suppresses the movement of the casting material from the sections between the cylinder bores to the surrounding sections due to the difference in the solidification rates.

Since the film 5 is formed together with the projections 3, the adhesion between the cylinder block 11 and the high temperature liner portion 26 is increased. This ensures sufficient thermal conductivity between the cylinder block 11 and the high temperature liner portion 26.

Further, since the projections 3 increase the bond strength between the cylinder block 11 and the cylinder liner 2, exfoliation of the cylinder block 11 and the cylinder liner 2 is suppressed. Therefore, even if the cylinder bore 15 is expanded, sufficient thermal conductivity between the cylinder block 11 and the high temperature liner portion 26 is ensured.

In this manner, the use of the cylinder liner 2 of the present embodiment ensures sufficient bond strength between the cylinder liner 2 and the casting material of the cylinder block 11, and sufficient thermal conductivity between the cylinder liner 2 and the cylinder block 11.

According to the results of tests, the present inventors found out that in the cylinder block having the reference cylinder liners, a relatively large gap existed between the cylinder block and each cylinder liner. That is, if projections with constrictions are simply formed on the cylinder liner, sufficient adhesion between the cylinder block and the cylinder liner will not be ensured. This will inevitably lower the thermal conductivity due to gaps.

(2) According to the cylinder liner 2 of the present embodiment, the above described improvement of the thermal conductivity lowers the cylinder wall temperature TW of the high temperature liner portion 26. Thus, the consumption of the engine oil is suppressed. This improves the fuel consumption rate.

(3) According to the cylinder liner 2 of the present embodiment, the above described improvement of the bond strength suppresses deformation of the cylinder bores 15 in the engine, so that the friction is reduced. This improves the fuel consumption rate.

(4) In the cylinder liner 2 of the present embodiment, the film 5 is formed such that its thickness TP of the high temperature liner portion 26 is less than or equal to 0.5 mm. This increases the bond strength between the cylinder block 11 and the high temperature liner portion 26. If the film thickness TP is greater than 0.5 mm, the anchor effect of the projections 3 will be reduced, resulting in a significant reduction in the liner bond strength.

(5) In the cylinder liner 2 of the present embodiment, the projections 3 are formed such that the standard projection number NP is in the range from five to sixty. This further increases the liner bond strength. Also, the filling factor of the casting material to spaces between the projections 3 is increased.

If the standard projection number NP is out of the selected range, the following problems will be caused. If the standard projection number NP is less than five, the number of the projections 3 will be insufficient. This will reduce the liner bond strength. If the standard projection number NP is more than sixty, narrow spaces between the projections 3 will reduce the filing factor of the casting material to spaces between the projections 3.

(6) In the cylinder liner 2 of the present embodiment, the projections 3 are formed such that the standard projection length HP is in the range from 0.5 mm to 1.0 mm. This increases the liner bond strength and the accuracy of the outer diameter of the cylinder liner 2.

If the standard projection length HP is out of the selected range, the following problems will be caused. If the standard projection length HP is less 0.5 mm, the height of the projections 3 will be insufficient. This will reduce the liner bond strength. If the standard projection length HP is more 1.0 mm, the projections 3 will be easily broken. This will also reduce the liner bond strength. Also, since the heights of the projection 3 are uneven, the accuracy of the outer diameter is reduced.

(7) In the cylinder liner 2 of the present embodiment, the projections 3 are formed such that the first area ratio SA is in the range from 10% to 50%. This ensures sufficient liner bond strength. Also, the filling factor of the casting material to spaces between the projections 3 is increased.

If the first area ratio SA is out of the selected range, the following problems will be caused. If the first area ratio SA is less than 10%, the liner bond strength will be significantly reduced compared to the case where the first area ratio SA is more than or equal to 10%. If the first area ratio SA is more than 50%, the second area ratio SB will surpass the upper limit value (55%). Thus, the filling factor of the casting material in the spaces between the projections 3 will be significantly reduced.

(8) In the cylinder liner 2 of the present embodiment, the projections 3 are formed such that the second area ratio SB is in the range from 20% to 55%. This increases the filling factor of the casting material to spaces between projections 3. Also, sufficient liner bond strength is ensured.

If the second area ratio SB is out of the selected range, the following problems will be caused. If the second area ratio SB is less than 20%, the first area ratio SA will fall below the lower limit value (10%). Thus, the liner bond strength will be significantly reduced. If the second area ratio SB is more than 55%, the filling factor of the casting material in the spaces between the projections 3 will be significantly reduced compared to the case where the second area ratio SB is less than or equal to 55%.

(9) In the cylinder liner 2 of the present embodiment, the projections 3 are formed such that the standard cross-sectional area SD is in the range from 0.2 $mm^2$ to 3.0 $mm^2$. Thus, during the producing process of the cylinder liners 2, the projections 3 a prevented from being damaged. Also, the filling factor of the casting material to spaces between the projections 3 is increased.

If the standard cross-sectional area SD is out of the selected range, the following problems will be caused. If the standard cross-sectional area SD is less than 0.2 $mm^2$, the strength of the projections 3 will be insufficient, and the projections 3 will be easily damaged during the production of the cylinder liner 2. If the standard cross-sectional area SD is more than 3.0 $mm^2$, narrow spaces between the projections 3 will reduce the filing factor of the casting material to spaces between the projections 3.

(10) In the cylinder liner 2 of the present embodiment, the projections 3 (the first areas RA) are formed to be independent from one another on the first reference plane PA. This increases the filling factor of the casting material to spaces between projections 3. If the projections 3 (the first areas RA) are not independent from one another in the first reference plane PA, narrow spaces between the projections 3 will reduce the filing factor of the casting material to spaces between the projections 3.

(11) In the cylinder liner 2 of the present embodiment, the film 5 is formed on each projection 3 so that the constriction space 34 is not filled by the film 5. Accordingly, when performing the insert casting of the cylinder liners 2, a sufficient amount of the casting material flows into the constriction space 34. This prevents the liner bond strength from being lowered.

(12) In an engine, an increase in the cylinder wall temperature TW causes the cylinder bores to be thermally expanded. On the other hand, since the cylinder wall temperature TW varies along the axial direction, the amount of deformation of the cylinder bores varies along the axial direction. Such variation in deformation amount of a cylinder increases the friction of the piston, which degrades the fuel consumption rate.

In the cylinder liner 2 of the present embodiment, the film 5 is not formed on the liner outer circumferential surface 22 of the low temperature liner portion 27, while the film 5 is formed on the liner outer circumferential surface 22 of the high temperature liner portion 26.

Accordingly, the cylinder wall temperature TW of the high temperature liner portion 26 of the engine 1 (broken line in FIG. 6[B]) falls below the cylinder wall temperature TW of the high temperature liner portion 26 of the reference engine (solid line in FIG. 6[B]). On the other hand, the cylinder wall temperature TW of the low temperature liner portion 27 of the engine 1 (broken line in FIG. 6[B]) is substantially the same as the cylinder wall temperature TW of the low temperature liner portion 27 (solid line in FIG. 6[B]) of the reference engine.

Therefore, the difference between the minimum cylinder wall temperature TWL and the maximum cylinder wall temperature TWH in the engine 1 (cylinder wall temperature difference Δ TW) is reduced. Thus, variation of deformation of each cylinder bore 15 along the axial direction is reduced (the amount of deformation is equalized). Accordingly, the amount of deformation of each cylinder bore 15 is equalized. This reduces the friction of the piston and thus improves the fuel consumption rate.

(13) In the engine 1, the distance between the cylinder bores 15 is reduced to improve the fuel consumption rate. Therefore, when producing the cylinder block 11, sufficient bond strength between the cylinder liner 2 and the casting material, and sufficient thermal conductivity between the cylinder block 11 and the cylinder liners 2 need to be ensured.

The cylinder liner 2 of the present embodiment ensures sufficient bond strength of the cylinder liner 2 with the casting material, and sufficient thermal conductivity between the cylinder liner 2 and the cylinder block 11. This allows the distance between the cylinder bores 15 to be reduced. Accordingly, since the distance between the cylinder bores 15 in the engine 1 is shorter than that of conventional engines, the fuel consumption rate is improved.

(14) In the present embodiment, the film 5 is formed of a sprayed layer of Al—Si alloy. This reduces the difference between the degree of expansion of the cylinder block 11 and the degree of expansion of the film 5. Thus, when the cylinder bore 15 expands, the adhesion between the cylinder block 11 and the cylinder liner 2 is ensured.

(15) Since an Al—Si alloy that has a high wettability with the casting material of the cylinder block 11 is used, the adhesion and the bond strength between the cylinder block 11 and the film 5 are further increased.

Modifications of Embodiment

The above illustrated first embodiment may be modified as shown below.

Although Al—Si alloy is used as the aluminum alloy in the first embodiment, other aluminum alloys (Al—Si—Cu alloy and Al—Cu alloy) may be used.

In the first embodiment, the film 5 is formed of the sprayed layer 51. However, the configuration may be modified as shown below. That is, the film 5 may be formed a sprayed layer of copper or a copper alloy. In these cases, similar advantages to those of the first embodiment are obtained.

Second Embodiment

A second embodiment of the present invention will now be described with reference to FIGS. 19 and 20.

The second embodiment is configured by changing the formation of the films in the cylinder liner according to the first embodiment in the following manner. The cylinder liner according to the second embodiment is the same as that of the first embodiment except for the configuration described below.

<Formation of Film>

Figure 19:
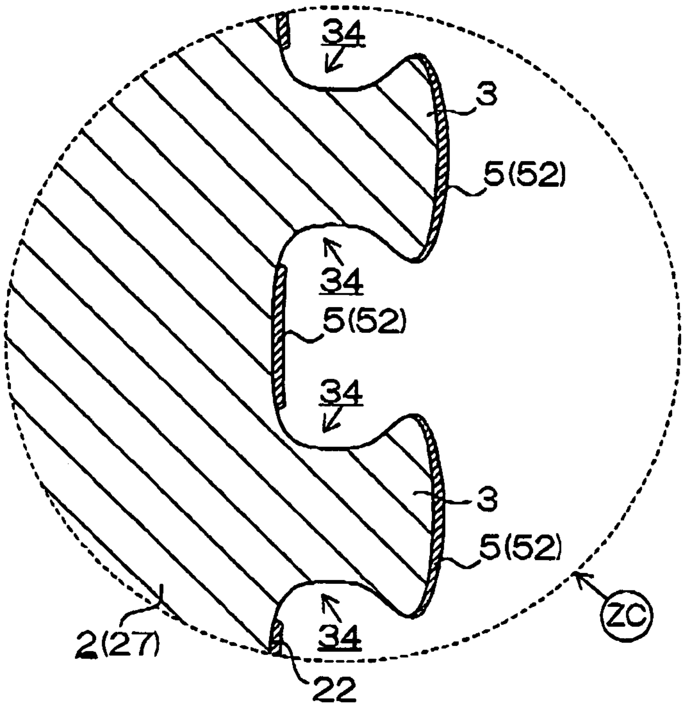
FIG. 19 is an enlarged cross-sectional view of a second embodiment of the present invention, showing encircled part ZC of FIG. 6.

FIG. 19 is an enlarged view showing encircled part ZC of FIG. 6[A].

In the cylinder liner 2, a film 5 is formed on a liner outer circumferential surface 22 of a high temperature liner portion 26. The film 5 is formed of an aluminum shot coating layer (coating layer 52). The shot coating layer refers to a film formed by shot coating.

Other materials that meet at least one of the following conditions (A) and (B) may be used as the material of the film 5.

(A) A material the melting point of which is lower than or equal to the reference molten metal temperature TC, or a material containing such a material.

(B) A material that can be metallurgically bonded to the casting material of the cylinder block 11, or a material containing such a material.

<Bonding State of Cylinder Block and High Temperature Liner Portion>

Figure 20:
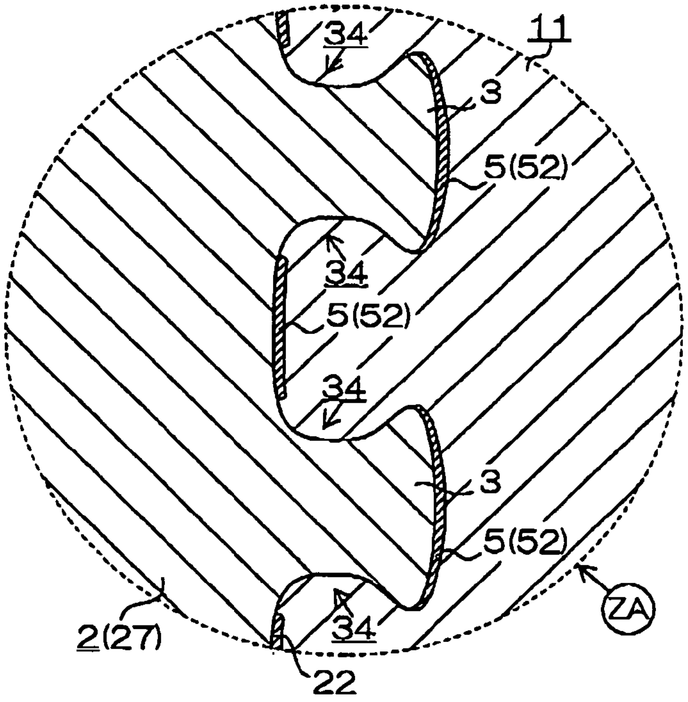
FIG. 20 is an enlarged cross-sectional view of the cylinder liner according to the second embodiment, showing encircled part ZA of FIG. 1.

FIG. 20 shows the bonding state between the cylinder block 11 and the high temperature liner portion 26 (cross section of part ZA of FIG. 1).

In the engine 1, the cylinder block 11 is bonded to the high temperature liner portion 26 in a state where the cylinder block 11 is engaged with the projections 3. Also, the cylinder block 11 and the high temperature liner portion 26 are bonded to each other with the film 5 in between.

As for the bonding state of the high temperature liner portion 26 and the film 5, since the film 5 is formed by shot coating, the high temperature liner portion 26 and the film 5 are mechanically and metallurgically bonded to each other with sufficient adhesion and bond strength. That is, the high temperature liner portion 26 and the film 5 are bonded to each other in a state where mechanically bonded portions and metallurgically bonded portions are mingled. The adhesion of the high temperature liner portion 26 and the film 5 is higher than the adhesion of the cylinder block and the reference cylinder liner in the reference engine.

As for the bonding state of the cylinder block 11 and the film 5, the film 5 is formed of an aluminum alloy that has a melting point lower than or equal to the reference molten metal temperature TC and a high wettability with the casting material of the cylinder block 11. Thus, the cylinder block 11 and the film 5 are mechanically bonded to each other with sufficient adhesion and bond strength. The adhesion of the cylinder block 11 and the film 5 is higher than the adhesion of the cylinder block and the reference cylinder liner in the reference engine.

In the engine 1, since the cylinder block 11 and the high temperature liner portion 26 are bonded to each other in this state, the following advantages are obtained. As for the mechanical joint between the cylinder block 11 and the film 5, the same explanation as that of the first embodiment can be applied.

(A) Since the film 5 ensures the adhesion between the cylinder block 11 and the high temperature liner portion 26, the thermal conductivity between the cylinder block 11 and the high temperature liner portion 26 is increased.

(B) Since the film 5 ensures the bond strength between the cylinder block 11 and the high temperature liner portion 26, exfoliation of the cylinder block 11 and the high temperature liner portion 26 is suppressed. Therefore, even if the cylinder bore 15 is expanded, the adhesion of the cylinder block 11 and the high temperature liner portion 26 is maintained. This suppresses the reduction in the thermal conductivity.

(C) Since the projections 3 ensures the bond strength between the cylinder block 11 and the high temperature liner portion 26, exfoliation of the cylinder block 11 and the high temperature liner portion 26 is suppressed. Therefore, even if the cylinder bore 15 is expanded, the adhesion of the cylinder block 11 and the high temperature liner portion 26 is maintained. This suppresses the reduction in the thermal conductivity.

Advantages of Embodiment

In addition to the advantages similar to the advantages (1) to (15) in the first embodiment, the cylinder liner of the second embodiment provides the following advantage.

(16) In the shot coating, the film 5 is formed without melting the coating material. Therefore, the surface of the film 5 is prevented from being oxidized, and the film 5 is less likely to contain oxides.

In the cylinder liner 2 of the present embodiment, the film 5 is formed by shot coating. Therefore, the thermal conductivity of the film 5 is prevented from degraded by oxides. Since the wettability with the casting material is improved through the suppression of the oxidation of the film surface, the adhesion between the cylinder block 11 and the film 5 is further improved.

Modifications of Embodiment

The above illustrated second embodiment may be modified as shown below.

In the second embodiment, aluminum is used as the material for the coating layer 52. However, for example, the following materials may be used.

[a] Zinc

[b] Tin

[c] An alloy that contains at least two of aluminum, zinc, and tin.

Third Embodiment

A third embodiment of the present invention will now be described with reference to FIGS. 21 and 22.

The third embodiment is configured by changing the formation of the films in the cylinder liner according to the first embodiment in the following manner. The cylinder liner according to the third embodiment is the same as that of the first embodiment except for the configuration described below.

<Formation of Film>

Figure 21:
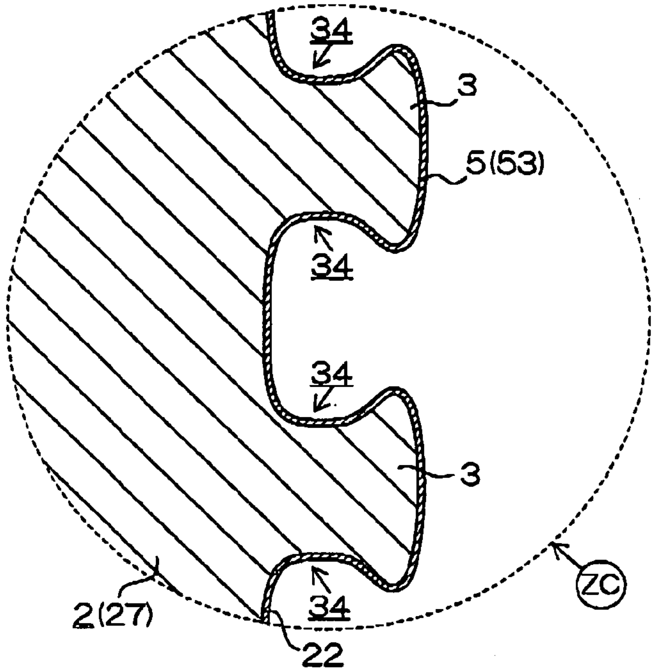
FIG. 21 is an enlarged cross-sectional view of a third embodiment of the present invention, showing encircled part ZC of FIG. 6.

FIG. 21 is an enlarged view showing encircled part ZC of FIG. 6[A].

In the cylinder liner 2, a film 5 is formed on a liner outer circumferential surface 22 of a high temperature liner portion 26. The film 5 is formed of a copper alloy plated layer 53. The plated layer refers to a film formed by plating.

Other materials that meet at least one of the following conditions (A) and (B) may be used as the material of the film 5.

(A) A material the melting point of which is lower than or equal to the reference molten metal temperature TC, or a material containing such a material.

(B) A material that can be metallurgically bonded to the casting material of the cylinder block 11, or a material containing such a material.

<Bonding State of Cylinder Block and High Temperature Liner Portion>

Figure 22:
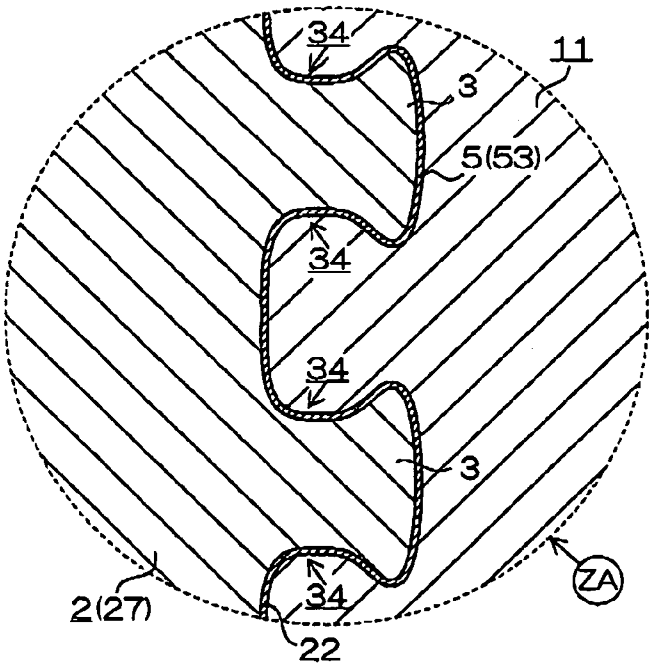
FIG. 22 is an enlarged cross-sectional view of the cylinder liner according to the third embodiment, showing encircled part ZA of FIG. 1.

FIG. 22 shows the bonding state between the cylinder block 11 and the high temperature liner portion 26 (cross section of part ZA of FIG. 1).

In the engine 1, the cylinder block 11 is bonded to the high temperature liner portion 26 in a state where part of the cylinder block 11 is located in each of the constriction spaces 34. Also, the cylinder block 11 and the high temperature liner portion 26 are bonded to each other with the film 5 in between.

As for the bonding state of the high temperature liner portion 26 and the film 5, since the film 5 is formed by plating, the high temperature liner portion 26 and the film 5 are mechanically bonded to each other with sufficient adhesion and bond strength. The adhesion of the high temperature liner portion 26 and the film 5 is higher than the adhesion of the cylinder block and the reference cylinder liner in the reference engine.

As for the bonding state of the cylinder block 11 and the film 5, the film 5 is formed of a copper alloy that has a melting point higher than the reference molten metal temperature TC. However, the cylinder block 11 and the film 5 are metallurgically bonded to each other with sufficient adhesion and bond strength. The adhesion of the cylinder block 11 and the film 5 is higher than the adhesion of the cylinder block and the reference cylinder liner in the reference engine.

In the engine 1, since the cylinder block 11 and the high temperature liner portion 26 are bonded to each other in this state, the following advantages are obtained.

(A) Since the film 5 ensures the adhesion between the cylinder block 11 and the high temperature liner portion 26, the thermal conductivity between the cylinder block 11 and the high temperature liner portion 26 is increased.

(B) Since the film 5 ensures the bond strength between the cylinder block 11 and the high temperature liner portion 26, exfoliation of the cylinder block 11 and the high temperature liner portion 26 is suppressed. Therefore, even if the cylinder bore 15 is expanded, the adhesion of the cylinder block 11 and the high temperature liner portion 26 is maintained. This suppresses the reduction in the thermal conductivity.

(C) Since the film 5 is formed of a copper alloy having a greater thermal conductivity than that of the cylinder block 11, the thermal conductivity between the cylinder block 11 and the high temperature liner portion 26 is increased.

(D) Since the projections 3 ensures the bond strength between the cylinder block 11 and the high temperature liner portion 26, exfoliation of the cylinder block 11 and the high temperature liner portion 26 is suppressed. Therefore, even if the cylinder bore 15 is expanded, the adhesion of the cylinder block 11 and the high temperature liner portion 26 is maintained. This suppresses the reduction in the thermal conductivity.

To metallurgically bonding the cylinder block 11 and the film 5 to each other, it is believed that the film 5 basically needs to be formed with a metal having a melting point equal to or less than the reference molten metal temperature TC. However, according to the results of the tests performed by the present inventors, even if the film 5 is formed of a metal having a melting point higher than the reference molten metal temperature TC, the cylinder block 11 and the film 5 are metallurgically bonded to each other in some cases.

Advantages of Embodiment

In addition to the advantages similar to the advantages (1) to (13) in the first embodiment, the cylinder liner of the third embodiment provides the following advantage.

(17) In the present embodiment, the film 5 is formed of a copper alloy. Accordingly, the cylinder block 11 and the film 5 are metallurgically bonded to each other. The adhesion and the bond strength between the cylinder block 11 and the high temperature liner portion 26 are further increased.

(18) Since the copper alloy has a high thermal conductivity, the thermal conductivity between the cylinder block 11 and the high temperature liner portion 26 is significantly increased.

Modifications of Embodiment

The above illustrated third embodiment may be modified as shown below.

In the third embodiment, the plated layer 53 may be formed of copper.

Other Embodiments

The above embodiments may be modified as follows.

In the above illustrated embodiments, the selected ranges of the first area ratio SA and the second area ratio SB are set be in the selected ranges shown in Table 1. However, the selected ranges may be changed as shown below.

The first area ratio SA: 10%-30%

The second area ratio SB: 20%-45%

This setting increases the liner bond strength and the filling factor of the casting material to the spaces between the projections 3.

In the above embodiments, the selected range of the standard projection length HP is set to a range from 0.5 mm to 1.0 mm. However, the selected range may be changed as shown below. That is, the selected range of the standard projection length HP may be set to a range from 0.5 mm to 1.5 mm.

In the above embodiments, the film 5 is not formed on the liner outer circumferential surface 22 of the low temperature liner portion 27, while the film 5 is formed on the liner outer circumferential surface 22 of the high temperature liner portion 26. This configuration may be modified as follows. That is, the film 5 may be formed on the liner outer circumferential surface 22 of both of the low temperature liner portion 27 and the high temperature liner portion 26. This configuration reliably prevents the cylinder wall temperature TW at some locations from being excessively increased.

The method for forming the film 5 is not limited to the methods shown in the above embodiments (spraying, shot coating, and plating). Any other method may be applied as necessary.

The configuration of the cylinder liner 2 according to the above embodiments may be modified as shown below. That is, the thickness of the high temperature liner portion 26 may be set less than the thickness of the low temperature liner portion 27, so that the thermal conductivity of the high temperature liner portion 26 is greater than that of the low temperature liner portion 27. In this case, since the cylinder wall temperature difference ΔTW is reduced, the amount of deformation of the cylinder bore 15 is equalized along the axial direction. This improves the fuel consumption rate. The setting of the thicknesses may be, for example, the following items (A) and (B).

(A) In each of the high temperature liner portion 26 and the low temperature liner portion 27, the thickness is made constant, and the thickness of the high temperature liner portion 26 is set smaller than that of the low temperature liner portion 27.

(B) The thickness of the cylinder liner 2 is gradually decreased from the liner lower end 24 to the liner upper end 23.

The configuration of the formation of the film 5 according to the above embodiments may be modified as shown below. That is, the film 5 may be formed of any material as long as at least one of the following conditions (A) and (B) is met.

(A) The thermal conductivity of the film 5 is equal to or more than that of the cylinder liner 2.

(B) The thermal conductivity of the film 5 is equal to or more than that of the cylinder block 11.

In the above embodiments, the film 5 is formed on the cylinder liner 2 with the projections 3 the formation parameters of which are in the selected ranges of Table 1. However, the film 5 may be formed on any cylinder liner as long as the projections 3 are formed on it.

In the above embodiment, the cylinder liner of the present embodiment is applied to an engine made of an aluminum alloy. However, the cylinder liner of the present invention may be applied to an engine made of, for example, a magnesium alloy. In short, the cylinder liner of the present invention may be applied to any engine that has a cylinder liner. Even in such case, the advantages similar to those of the above embodiments are obtained if the invention is embodied in a manner similar to the above embodiments.

The present examples and embodiments are to be considered as illustrative and not restrictive and the invention is not to be limited to the details given herein, but may be modified within the scope and equivalence of the appended claims.

The invention claimed is:

1. A cylinder liner for insert casting used in a cylinder block, comprising an outer circumferential surface having a plurality of projections, each projection having a constricted shape that forms a constriction space, wherein a film of a metal material is formed on the outer circumferential surface and the surfaces of the projections such that the constriction space is not filled by the film, but instead is filled by a casting material.

2. The cylinder liner according to claim 1, wherein the film is formed of a sprayed layer.

3. The cylinder liner according to claim 1, wherein the film is formed of a shot coating layer.

4. The cylinder liner according to claim 1, wherein the film is formed of a plated layer.

5. The cylinder liner according to claim 1, wherein the film is metallurgically bonded to the cylinder block.

6. The cylinder liner according to claim 1, wherein the film has a melting point that is lower than or equal to a temperature of a molten casting material used in the insert casting of the cylinder liner with the cylinder block.

7. The cylinder liner according to claim 1, wherein the film has a higher thermal conductivity than that of the cylinder liner.

8. The cylinder liner according to claim 1, wherein the film has a higher thermal conductivity than that of the cylinder block.

9. The cylinder liner according to claim 1, wherein the thickness of the film is less than or equal to 0.5 mm.

10. The cylinder liner according to claim 1, wherein the film extends from one end to a middle portion of the cylinder liner with respect to an axial direction of the cylinder liner.

11. The cylinder liner according to claim 1, wherein the film extends from one end to the other end of the cylinder liner with respect to an axial direction of the cylinder liner.

12. The cylinder liner according to claim 1, wherein the cylinder liner has an upper portion and a lower portion in relation to a middle portion with respect to the axial direction of the cylinder liner, wherein the thickness of the upper portion is less than the thickness of the lower portion.

13. The cylinder liner according to claim 1, wherein the number of the projections is five to sixty per 1 $cm^2$ of the outer circumferential surface of the cylinder liner.

14. The cylinder liner according to claim 1, wherein the height of each projection is 0.5 to 1.5 mm.

15. The cylinder liner according to claim 1, wherein the projections are formed such that, in a contour diagram of the outer circumferential surface of the cylinder liner obtained by a three-dimensional laser measuring device, the ratio of the total area of regions each surrounded by a contour line representing a height of 0.4 mm to the area of the entire contour diagram is equal to or more than 10%.

16. The cylinder liner according to claim 1, wherein the projections are formed such that, in a contour diagram of the outer circumferential surface of the cylinder liner obtained by a three-dimensional laser measuring device, the ratio of the total area of regions each surrounded by a contour line representing a height of 0.2 mm to the area of the entire contour diagram is equal to or less than 55%.

17. The cylinder liner according to claim 1, wherein the projections are formed such that, in a contour diagram of the outer circumferential surface of the cylinder liner obtained by a three-dimensional laser measuring device, the ratio of the total area of regions each surrounded by a contour line representing a height of 0.4 mm to the area of the entire contour diagram is 10 to 50%.

18. The cylinder liner according to claim 1, wherein the projections are formed such that, in a contour diagram of the outer circumferential surface of the cylinder liner obtained by a three-dimensional laser measuring device, the ratio of the total area of regions each surrounded by a contour line representing a height of 0.2 mm to the area of the entire contour diagram is 20 to 55%.

19. The cylinder liner according to claim 1, wherein the projections are formed such that, in a contour diagram of the outer circumferential surface of the cylinder liner obtained by a three-dimensional laser measuring device, the area of each region surrounded by a contour line representing a height of 0.4 mm is 0.2 to 3.0 $mm^2$.

20. The cylinder liner according to claim 1, wherein, in a contour diagram of the outer circumferential surface of the cylinder liner obtained by a three-dimensional laser measuring device, regions that each correspond to one of the projections and are each surrounded by a contour line representing a height of 0.4 mm are independent from one another.

21. The cylinder liner according to claim 1, wherein the film is formed only on the outer circumferential surface and the surfaces of the projections such that the constriction space is not filled by the film, but instead is filled by a casting material.

22. The cylinder liner according to claim 1, wherein the projections are dotted around the outer circumferential surface of the cylinder liner.

23. An engine comprising a cylinder block and a cylinder liner for insert casting, the cylinder liner being bonded to the cylinder block, wherein the cylinder liner includes an outer circumferential surface having a plurality of projections, each projection having a constricted shape that forms a constriction space, and wherein a film of a metal material is formed on the outer circumferential surface and the surfaces of the projections such that the constriction space is not filled by the film, but instead is filled by a casting material.

24. A cylinder liner for insert casting used in a cylinder block, comprising an outer circumferential surface having a plurality of projections, each projection having a constricted shape that forms a constriction space, wherein a film of a metal material is formed on the outer circumferential surface and the surfaces of the projections such that the constriction space is not filled by the film, but instead is filled by a casting material, the film increasing adhesion of the cylinder liner to the cylinder block.

* * * * *

UNITED STATES PATENT AND TRADEMARK OFFICE

CERTIFICATE OF CORRECTION

PATENT NO. : 7,882,818 B2
APPLICATION NO. : 11/481074
DATED : February 8, 2011
INVENTOR(S) : Toshihiro Takami et al.

It is certified that error appears in the above-identified patent and that said Letters Patent is hereby corrected as shown below:

| Column | Line | |
|---|---|---|
| 9 | 13 | Change “part **2**B” to --part ZB--. |

Signed and Sealed this
Fifth Day of July, 2011

David J. Kappos
*Director of the United States Patent and Trademark Office*